United States Patent [19]

Ostrowski

[11] 4,215,240

[45] Jul. 29, 1980

[54] PORTABLE VOICE SYSTEM FOR THE VERBALLY HANDICAPPED

[75] Inventor: Carl L. Ostrowski, Sterling Heights, Mich.

[73] Assignee: Federal Screw Works, Detroit, Mich.

[21] Appl. No.: 850,669

[22] Filed: Nov. 11, 1977

[51] Int. Cl.² ............................................. G10L 1/00
[52] U.S. Cl. .................................................. 179/1 SM
[58] Field of Search ..................................... 179/1 SM

[56] References Cited

U.S. PATENT DOCUMENTS

| | | | |
|---|---|---|---|
| 3,704,345 | 11/1972 | Coker et al. | 179/1 SM |
| 3,794,753 | 2/1974 | Hansen | 179/1 SM |
| 4,016,540 | 4/1977 | Hyatt | 179/1 SM |
| 4,022,974 | 5/1977 | Kohut et al. | 179/1 SM |

OTHER PUBLICATIONS

MSC, "Expandable Voice Annunciator", Spec. Sheet, PTO date, Sep. 18, 1976, pp. 1–4.

Primary Examiner—Malcolm A. Morrison
Assistant Examiner—E. S. Kemeny
Attorney, Agent, or Firm—Harness, Dickey & Pierce

[57] ABSTRACT

A completely self-contained, battery operated, portable voice system for the verbally handicapped which is sufficiently compact to be hand held. The system contains a preestablished vocabulary of words, phonemes, and phrases which are accessible by the non-verbal via a keyboard. The desired message is then phonetically spoken by a speech synthesizer contained in the unit upon the depression of a TALK key. For verbally handicapped persons with minimal motor capabilities, the present invention is adapted to be operable in a scrolling scanning or "scrolling" mode wherein the numerical display is automatically rotated in sequence and the selections entered by activating a sensor switch with a single body function to stop the display at the desired number.

14 Claims, 4 Drawing Figures

| 92 | 94 | 96 | 98 | 100 | 102 | 104 | 106 |
|---|---|---|---|---|---|---|---|
| Level 1 | 2 | 3 | 4 | Talk | Talk Repeat | Clear | Master Clear |
| Pause | Grandfather | Clothes | Head | Think | Feel | Embarrassed | Give |
| Echo On | Grandmother | Shirt | Face | Cry | Fine | Hungry | Take |
| Echo Off | Brother | Pants | Eye | See | Excited | Am | Keep |
| Beep On/Off | Sister | Dress | Ear | Near | Surprise | Are | Open |
| Phrase Mode Save/New | Dad | Suit | Nose | Smell | Love | Is | Close |
| Memory 1 | Mom | Sock | Teeth | Smile | Happy | Be | Come |
| Memory 2 | Friend | Shoe | Back | Talk | Sad | Been | Go |
| Yes | Man | Sweater | Arm | Look | Sorry | Have | Went |
| No | Woman | Jacket | Hand | Listen | Tired | Was | Start |
| Okay | Boy | Coat | Finger | Move | Hurt | Will | Stop |
| Hello | Girl | Hat | Leg | Run | Sick | I Am Using An Artificial Voice | Try |
| Bye | Baby | Mittens | Feet | Walk | Pain | Need | Can |
| Please | Policeman | Purse | Wear | Swim | Angry | Help | Can't |
| Thank You | Teacher | Body | Change | Play | Afraid | Like | Do |
| Family | Therapist | Hair | Understand | Work | Upset | Want | Don't |

FIG. 4.

PORTABLE VOICE SYSTEM FOR THE VERBALLY HANDICAPPED

BACKGROUND AND SUMMARY OF THE INVENTION

The present invention relates to a completely self-contained device that is specifically adapted to permit the non-verbal individual to communicate with speech.

It has long been the dream of many to devise a device that would provide the verbally handicapped with man's most widely used communication mode: speech. For the first time such a device now exists in the form of the present invention. Moreover, the present invention is adapted to be useable by those non-verbal individuals who are also deaf, blind, or physically impaired. The device is completely self-contained and battery operated. And although the unit is compact and intended to be hand held, it is capable of producing a clear simulation of the human voice.

In a first embodiment of the present invention, words and phrases are selected by the non-verbal by entering appropriate three-digit number codes representing the desired words and phrases on a numeric keyboard. The non-verbal can then cause the device to speak the entered message by depressing a "TAlK" key located on the keyboard. More particularly, the first embodiment of the present device contains 994 "word" and phrase selections which can be entered via two different modes: (1) the direct keyboard entry mode which is provided for individuals with medium to maximum motor capabilities; and (2) the number scanning or "scrolling" mode for individuals with minimal motor capabilities. The first mode as noted is utilized simply by entering the appropriate number codes representing the desired words and phrases on the numeric keyboard. Selections are made with the second mode by stopping the digits in the display, which are electronically rotated or scrolled in sequence, at the desired numerical selection. The scanning mode is initiated by the non-verbal through an input sensor switch which is activated by a single body action. Each of the three digits in the numerical display is then automatically scrolled in sequence until stopped by successive activations of the input sensor switch with the same body action which initiated the scanning mode. Thus, for those non-verbal individuals with minimal motor capabilities, the present invention can be operated with a single body action.

In addition, the non-verbal may in either selection mode have the displayed numbers announced as they are selected. When using the scanning method the "echo" mode also verbally announces the numbers as they are visually rotated on the display. Consequently, a blind individual with minimal motor capabilities can utilize the present invention in the scanning mode.

The present invention provides the verbally handicapped with five integrated methods of speech construction: words, sentences/phrases, letters of the alphabet, phonemes (speech sounds), and morphemes (word syllables). The 994 available "word" selections in the first embodiment are allocated as follows:

(1) A constant vocabulary of 897 basic isolated words chosen for their frequency-of-occurrence in normal conversational speech. The automatic blending of words is achieved through the use of a speech synthesizer;

(2) Thirteen (13) common sentences and phrases are included in the repertoire, as for example: "My name is . . .";

(3) Twenty-six (26) words are dedicated to the pronounced letters of the alphabet to permit the non-verbal to communicate any thought by spelling;

(4) For the individual with some knowledge of phonetics, forty-five (45) different phonemes are included to provide the verbally handicapped with an unlimited speech vocabulary. Automatic blending of the phonemes into intelligible sounding speech is also achieved through the voice synthesizer; and (5) Finally, thirteen (13) morphemes are provided so that numerous additional words can be constructed merely by adding an additional syllable to the basic word. For example, the word "even" can be given its opposite meaning by adding the prefix "un".

As will subsequently be described in greater detail, the present invention comprises three basic components: the keyboard and its associated interface circuitry, a microprocessor and digital memory with appropriate interface circuitry, and a voice synthesizer. Information entered via the keyboard is initially stored in a message storage memory unit which in the preferred embodiments is capable of storing a maximum of forty (40) entries. When the "TALK" button is depressed, the microprocessor is programmed to sequentially read the three-digit coded entries stored in the message memory unit and access the appropriate address locations in the main vocabulary memory unit containing the words or phrases identified by the three-digit codes. More particularly, the 994 "words" in the system's vocabulary are stored phonetically in the vocabulary memory unit so that each "word" comprises one or more sequentially stored phonemes followed by a special end-of-word phoneme referred to as a "flag". Thus, for each "word" identified by a three-digit entry, the microprocessor will automatically access the address location in the vocabulary memory of the first phoneme in the "word" and then continue to access successive memory locations until the "flag" is encountered. The string of phonemes read from the vocabulary memory is then provided by the microprocessor to the speech synthesizer which converts the digital information into intelligible sounding human speech.

In a second embodiment of the present invention, a modified input device is provided having a keyboard area with 128 touch sensitive locations. The keyboard area comprises a flat surface with words and/or graphic symbols appearing at the touch sensitive locations. Entries are made via the keyboard simply by touching the designated areas. In addition, four shift levels provide each key with four different selections. Eight keys per level are dedicated to control functions, (e.g. "TALK"), thus providing a total of 480 possible entries.

Additional objects and advantages of the present invention will become apparent from a reading of the detailed description of the preferred embodiments which makes reference to the following set of drawings in which:

BRIEF DESCRIPTION OF THE DRAWINGS

FIG. 3 is a block diagram of the portable voice system according to the present invention; and FIG. 4 is a plan view of another embodiment of the present invention utilizing a different keyboard.

DETAILED DESCRIPTION OF THE PREFERRED EMBODIMENTS

Figure 1:
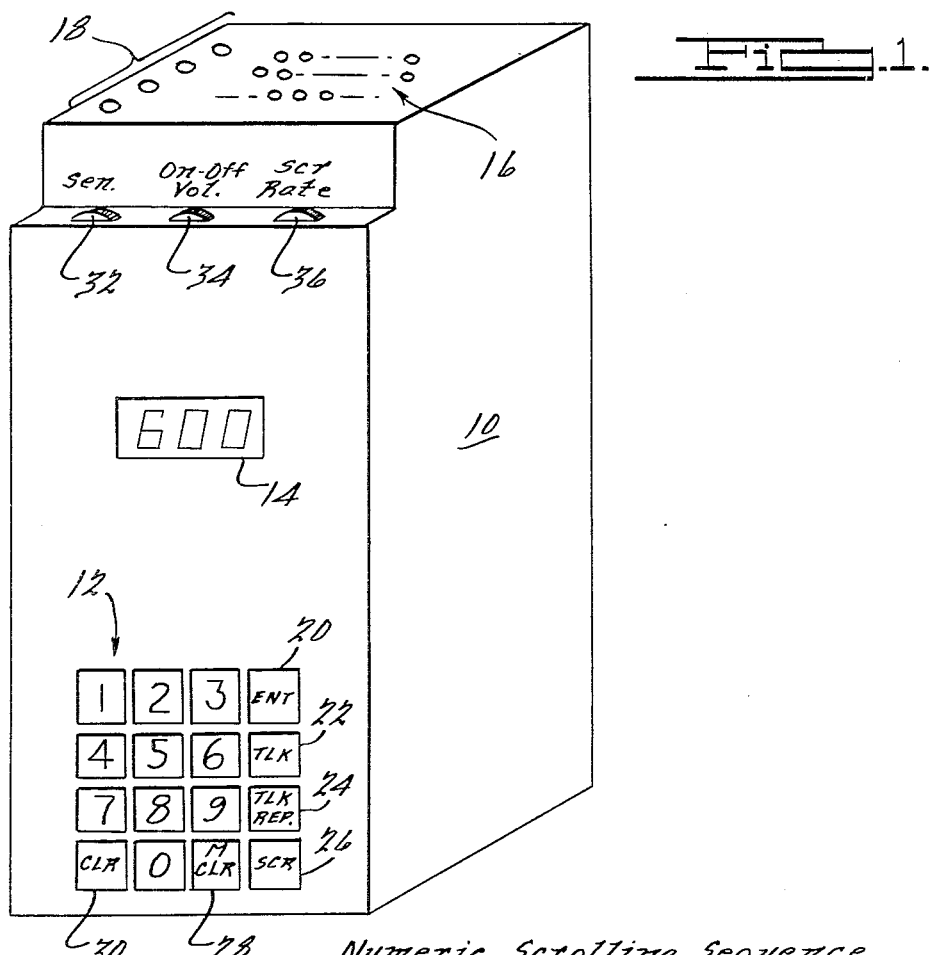
FIG. 1 is a perspective view of a portable voice system according to the present invention.

Referring to FIG. 1, a perspective view of a portable voice system for the verbally handicapped according to the present invention is shown. The unit 10 illustrated in FIG. 1 is completely self-contained, battery operated, and compact enough to be hand held. The device includes a 16-key keyboard 12, a liquid crystal three-digit display 14, and an internal speaker 16. A plurality of input/output jacks 18 are provided for such features as a battery charger input, an external speaker output, a contact switch input, and a sound switch input. The purpose of the latter two input jacks will be explained in connection with the description of the scanning mode of the present invention. In addition to an on/off-/volume control knob 34, the unit 10 also includes a sensitivity control knob 32 and a scroll rate control knob 36, whose functions will also be described in connection with the operation of the unit 10 in the scanning mode.

The embodiment of the present invention illustrated in FIG. 1 is adapted to be operated in two different selection modes: the keyboard mode and the scanning or "scrolling" mode. The keyboard mode is intended for use by verbally handicapped persons with normal motor capabilities and provides the most rapid means of word selection. Each "word" in the system's vocabulary is assigned a three-digit code, thus providing 1000 possible selections. The first six number codes are assigned to duplicate the control functions performed by the various function keys on the keyboard to provide the device 10 with complete function capability in the scrolling mode. Accordingly, the preferred embodiment of the present invention contains a vocabulary of 994 different "words".

As discussed previously, the 994 word vocabulary is used to provide five integrated methods of message construction. Specifically, the present system contains a constant vocabulary of 897 basic isolated words, 13 sentences or phrases, 26 words comprising the pronounced letters of the alphabet, 45 phonemes, and 13 morphemes. The contents of the vocabulary can of course be varied to adapt the unit to a particular individual's needs. However, it is believed that the combination of words and phonemes provides the non-verbal with the optimum in both convenience and flexibility. In particular, for ordinary conversational speech, it is anticipated that the non-verbal will be able to convey most messages utilizing the 897 isolated word vocabulary alone. Moreover, the simple addition of 13 morphemes increases the available word vocabulary even more. Consequently, for most speech requirements, the present invention provides a rapid and convenient means of message construction. Furthermore, with the addition of the 26 letters of the alphabet and the 45 basic phonemes, the user's vocabulary becomes unlimited. Accordingly, it can be seen that the preferred embodiment provides virtually optimum utilization of the 994 available "word" selections.

Word selection from the system's vocabulary is made by entering three-digit numbers via the keyboard 12. A selected three-digit code is stored in a temporary "message" memory by depressing the ENTER key 20. The message memory has a storage capacity of 40 entries. After 40 entries have been made, the voice will automatically say "memory full". A liquid crystal display 14 is also included to provide a visual indication of the numbers being entered on the keyboard 12 so that the user can visually verify the three-digit code selected before depressing the ENTER key 20. The device 10 is adapted to speak the entire message when the TALK key 22 is depressed. If the TALK key 22 is depressed again, the entire message will be repeated. The unit 10 is also adapted to visually display the selected three-digit codes in synchronization with the words as they are spoken by the synthesizer.

When the TALK REPEAT key 24 is depressed, the unit 10 is adapted to repeat the message in the temporary "message" memory indefinitely, with a slight pause inserted after each complete utterance. Thus, a verbally handicapped person can, for example, cause the unit 10 to continuously repeat the message, "I need help . . . I need help" without having to repeatedly depress the TALK key 22. As with the standard TALK key 22, activating the TALK REPEAT key 24 causes the unit to display the number selections in synchronization with the voice.

The MASTER CLEAR key 28 is used to initialize the unit in preparation for the assembly of the first message. Specifically, the MASTER CLEAR is adapted to erase the entire contents of the temporary message memory. Since the first entry made after the TALK key 22 has been depressed automatically clears the contents of the memory, it is unnecessary to activate the MASTER CLEAR key 28 before commencing the construction of each new message. The CLEAR key 30, on the other hand, serves to clear the display 14 only. However, if the display 14 is blank when the CLEAR key 30 is depressed, the last entry in the temporary message memory will be erased. Repeated depression of the CLEAR key 30 while the display 14 is blank will cause successive removal of the preceding entries. In the event that the user desires to save the message spoken for editing purposes, a SAVE function has been provided that is selected by entering the number 999 prior to activation of the TALK key 22. Entry of the number 999 causes the assembled message to be retained in memory after it is spoken so that the user may add to or delete from the message without destroying what has been assembled up to that point.

The SCROLL key 26 is utilized to switch the unit to its number scanning mode. Since the scanning mode is adapted for handicapped persons with minimal motor capabilities, the practical purpose of the SCROLL key 26 is to test the unit to insure that the scanning mode is functioning properly. Typically, the scanning mode will be activated by a signal received from a remote sound switch or contact switch connected to one of the appropriate input jacks 18. As previously noted, the present device 10 is adapted to be completely operable in response to signals received from a remote sensor switch that can be activated by a single body action; for example, a throat switch by grunts or hums, a palm switch by a simple movement of the hand, or a head switch by a movement of the head. A sensor switch of the type contemplated by the present invention is described in the copending U.S. application entitled "Acoustically Responsive Sensor Switch", Mark V. Dorais, Ser. No. 550,666 filed Nov. 11, 1977, and assigned to the assignee of the present invention, said description being incorporated herein by reference. The present device 10 is adapted to automatically switch to the number scanning mode upon the initial receipt of a signal from the remote sensor switch.

Figure 2:
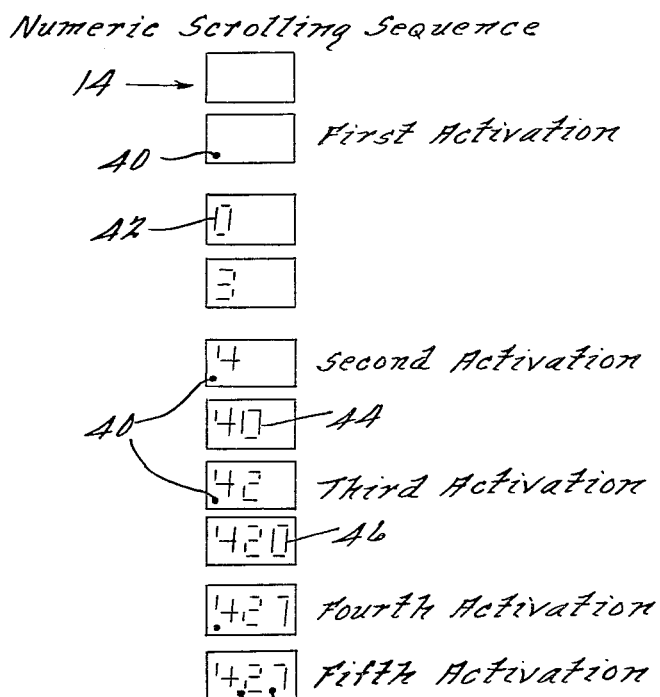
FIG. 2 illustrates the numeric scrolling sequence of the present invention when in the scanning mode.
Figure 2:
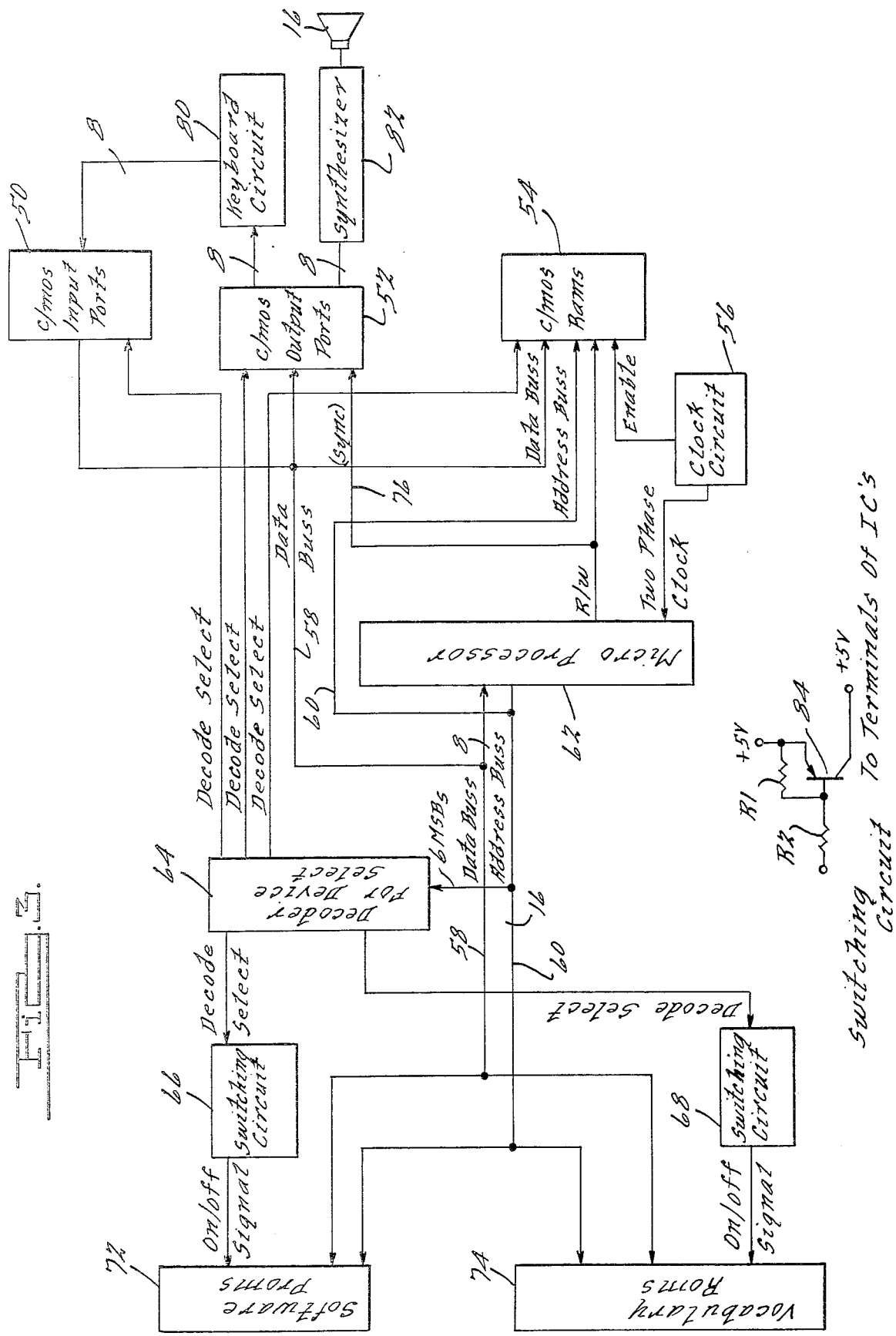

With particular reference to FIG. 2, the numeric scrolling sequence of the visual display 14 in the number scanning mode is illustrated. The first activation as noted, switches the unit to the scrolling mode, and a decimal point 40 appears in the lower left-hand corner of the display 14 to indicate receipt of a signal from the sensor switch. Subsequently, the first digit 42 automatically begins counting up from zero at a rate that is adjustably controlled by the setting of the scroll rate control knob 36. If the unit is also in the echo mode (to be subsequently described), the voice will speak the numbers as they appear on the display 14. The second activation of the sensor switch causes the display 14 to stop at the currently displayed number, and the decimal point 40 reappears to confirm receipt of the sensor switch signal. The middle digit 44 then automatically begins counting up from zero until the third activation of the sensor switch occurs, causing the middle digit 44 of the display 14 to stop at the number selected. Once the decimal point 40 again disappears, the right-hand digit 46 begins counting up from zero until it is stopped by the fourth activation of the sensor switch, which completes the three-digit selection. In the preferred embodiment, after the three-digit selection is complete, the two center decimal points 48 will momentarily appear during which time if a fifth activation of the sensor switch occurs, the voice will say "cancelled" and the displayed selection will be rejected and not stored in the temporary message memory. If no fifth activation occurs concurrent with the appearance of the two center decimal points 48, the selection is automatically stored in memory. Additionally, when in the echo mode, the identified word or phrase will be spoken while the display shows the three-digit number selected. As before, after 40 entries have been made, the voice will automatically say "memory full". However, when in the scrolling mode, upon entry of the 40th selection, the right-hand digit 46 will continue to scroll from 0-6 to permit entry of a control function command.

To provide the physically impaired with the same control functions available on the keyboard, the first six display numbers (001-006) are dedicated to control functions rather than word selection. Specifically, 001 is assigned to the TALK function, 002 to the TALK REPEAT function, 003 to the CLEAR function, and 005 to the MASTER CLEAR function. In both the scanning and keyboard mode, the 004 number will select either the announced (echo) or silent entry mode, alternatively. The 006 number is used in the scanning mode as a sensor on/off switch to either activate or deactivate the sensor or switch input 18. This permits an individual to store a message for speaking at a later point in time by preventing the possibility of inadvertent entries being made during the interim period. Finally, in both the scanning and keyboard mode, the 000 selection is used to provide a "pause" which may be selected to provide better separation between assembled statements.

Thus, it will be appreciated that in the scanning mode, the present invention is completely operable by a single body action which is detectable by a sensor switch. Consequently, the present invention is particularly adapted for use by verbally handicapped persons with severe physical limitations.

Looking now to FIG. 3, a block diagram of an artificial voice system according to the present invention is shown. The information from the keyboard 80 is provided to a plurality of C/MOS input latches 50 which are adapted to interface the keyboard 80 to the microprocessor 62. The microprocessor utilized in the preferred embodiment is manufactured by Motorola Corporation, Model No. 6800. The information from the input latches 50 is provided on the data buss line 58 to the microprocessor 62. The microprocessor 62 is programmed to analyze each entry as it is received from the keyboard 80 to insure that it is valid data. If valid, the information is written into a C/MOS storage RAM 54 by the microprocessor 62 when the ENTER key is depressed by providing a write signal on the read/write line 76. As noted previously, storage RAM 54 in the preferred embodiment has the capacity to store a maximum of 40 entries. When RAM 54 is full, the microprocessor 62 is programmed to instruct the synthesizer 82 to say, "memory full".

The software for the microprocessor 62 is contained in a pair of programmable read-only memories (PROMS) 72 which are connected to the microprocessor via the data buss and address buss lines, 58 and 60 respectively. It will be noted that since each of the various ROM, RAM, PROM, and I/O PORT blocks illustrated represent more than one integrated circuit, it becomes necessary to provide means for permitting the microprocessor 62 to distinguish between the various I.C.'s. Thus, a decoder circuit 64 is provided that is adapted to determine from the six most significant bits on the address buss line 60 which of the individual integrated circuits is to be accessed, and then provide an enable signal on the appropriate decode select output line leading from the decoder circuit 64 to enable the proper I.C. It will be appreciated, therefore, that only one integrated circuit is enabled at any one time. The decoder "chips" utilized in the preferred embodiment are manufactured by Texas Instruments, Manufacturing Nos. 74LS 154 and 74 LS 42.

Additionally, it will be noted that switching circuits 66 and 68 are inserted in the decode select enable lines from the decoder circuit 64 to the vocabulary ROMS 74 and the software PROMS 72. The switching circuits 66 and 68 help conserve the energy of the portable power source of the system by turning the software PROMS 72 and vocabulary ROMS 74 on only when a request is made, and turning the I.C.'s off when the request is satisfied. As shown in the small circuit diagram at the bottom of the figure, each individual switching circuit comprises a transistor 84 with its base terminal connected through a resistor R2 to the decode select line from the decoder circuit 64, and its collector terminal connected to the +5v terminal of the integrated circuit. A five volts source is connected to the emitter terminal of the transistor 84 and also to its base through another resistor R1. Thus, when an enable signal is received from the decoder circuit 64 (corresponding to a LO logic level), transistor 84 is rendered conductive thereby turning on the integrated circuit. Similarly, when the enable signal is terminated, transistor 84 is rendered nonconductive, and the integrated circuit is deactivated. Accordingly, it can be seen that switching circuits 66 and 68 prolong the life of the portable power source of the present system by minimizing the current draw on the power source when the digital storage circuits are not being used.

When the TALK control key is depressed on the keyboard (or a 001 entered in the scanning mode), the microprocessor 62 is adapted to sequentially access the entries stored in C/MOS RAM 54. In particular, microprocessor 62 is programmed to read the information stored in C/MOS RAM 54 by providing a read signal on read/write line 76, and then access the appropriate memory locations in vocabulary ROM 74. Each three-digit entry identifies the memory location in vocabulary ROMS 74 wherein the address location of the first phoneme in the desired "word" is stored. In other words, the first 994 memory locations in vocabulary ROMS 74 are dedicated to the storage of the addresses of the first phonemes in each of the 994 possible word selection. The remainder of the vocabulary ROMS 74 contains the various phonemes, words, and phrases (blocked off by "flags") in the system's repertoire. Thus, the microprocessor 62 actually goes through a two-step process in retrieving the "word" identified by each three-digit entry. For example, if the number 008 is entered, the microprocessor 62 is programmed to first access the memory location (4)008 in vocabulary ROMS 74 and read the address information contained therein. (Note, in the preferred embodiment herein, a "4" is always added as the most significant bit to the three-digit entry to signify to the decoder circuit 64 that the initial portion of the vocabulary ROMS 74 is to be accessed.) The microprocessor 62 is then programmed to access the address location read from location (4)008 wherein the first phoneme in the "word" identified by the 008 entry is contained. Lastly, the microprocessor reads the information contained in the accessed memory location and the successive memory locations until a "flag" is encountered. The reason for the two-step retrieval process is to permit maximum utilization of the 1000 available entries. Specifically, it will be appreciated that if the three-digit entry represented the memory location wherein the first phoneme in the identified word was stored, and the identified word comprised 10 phonemes, the following nine three-digit numbers would not be available as a keyboard selection because they would simply identify the memory location of a phoneme in the middle of another word or phrase.

Significantly, it will be noted that the 994 "words" in the system's vocabulary are phonetically stored in vocabulary ROMS 74. In particular, each stored phoneme actually comprises eight bits of information; six of the bits uniquely identify that particular phoneme, and the remaining two bits establish the inflection level of the phoneme. The synthesizer 82 is thus adapted to interpret the digital information as calling for the production of the identified phoneme at the inflection level defined. Accordingly, the preferred embodiment of the present system is adapted to utilize an 8-bit voice synthesizer 82, preferably of the type described in copending U.S. application, Ser. No. 836,589, filed Sept. 26, 1977 and entitled "Voice Synthesizer", said description being incorporated herein by reference.

The string of phonemes read from the vocabulary ROMS 74 is sequentially provided on the data buss line 58 by the microprocessor 62 to the C/MOS output ports 52, which comprise a plurality of C/MOS latch circuits similar to those used for the input ports 50. Specifically, each group of eight bits (one byte) is written in parallel into the latch circuits 52 in accordance with a write sync pulse provided by the microprocessor 62 on read/write line 76. The string of data bytes is then transmitted in sequence to the voice synthesizer 82 which is adapted to convert the information into intelligible sounding human speech. An additional eight bits of information are simultaneously provided to the keyboard circuit 80 so that the three-digit number entries can be shown on the display 14 in synchronization with the voiced output from the synthesizer 82. As is apparent from the description of the Voice Synthesizer in the cited copending application Ser. No. 836,589, filed Sept. 26, 1977, in order for the synthesizer 82 to properly integrate the phonemes generated into intelligible sounding speech, the microprocessor 62 must transmit data to the synthesizer 82 at as fast a rate as the synthesizer 82 can accept it, so that the output speech rate is controlled by the synthesizer 82. Specifically, the microprocessor 62 is programmed to provide to synthesizer 82 the succeeding byte of data in response to the end of each phoneme clock timing pulse produced by the synthesizer 82. The supplying of data on this type of demand basis is commonly referred to in the computer art as dedicated "hand-shaking".

Referring now to FIG. 4, a perspective view of a second embodiment of the present invention is shown. The second embodiment differs from the first embodiment principally in the input means used for selecting word entries. In place of the numeric calculator-style keyboard employed in the embodiment shown in FIG. 1, the second embodiment utilizes a flat surface keyboard area 90 having 128 touch-sensitive locations. Word selections are made via the modified keyboard 90 simply by touching one of the touch-sensitive locations. Entry into the temporary message memory is automatic. The keyboard 90 in the preferred embodiment is comprised of an 8×16 matrix of touch-sensitive switches manufactured by Datanetics Corp., Manufacturing No. DC404.

As illustrated in FIG. 4, each of the 128 touch-sensitive locations on the keyboard 90 is labeled with a word or phrase selection. In addition, four electronic shift keys 92-98 are included to provide each key with four possible word selections. Thus, since the eight keys in the top row in each level are dedicated to control functions, the second embodiment provides the non-verbal user with 120×4 or 480 possible selections. Preferably, the 480 available word selections are utilized to provide the same five integrated methods of message construction available in the first embodiment. Accordingly, the preferred vocabulary comprises 388 basic isolated words, 13 sentences or phrases, 26 words constituting the pronounced letters of the alphabet, 45 phonemes, and 13 morphemes.

Changeable color-coded overlays for each of the four shift levels are provided which are adapted to be placed over the keyboard area 90 to identify the 128 selections available in each level. The four shift keys 92-98 are colored to match their corresponding overlays. In addition, color-coded indicator light emitting diodes (LEDs) 92'-98' are located immediately above the shift keys 92-98 to provide the user with a visual indication of the shift level selected. The overlay illustrated in FIG. 4 corresponds to the first shift level in the preferred embodiment. Although each of the touch-sensitive key locations is labeled on the overlay with a word or phrase, it will be appreciated that the overlays can be labeled to represent words with symbols where appropriate if desired. This alternative would, of course, be desirable for devices that were intended for use by children or persons with limited reading skills.

Message construction with the second embodiment of the present invention is similar to the procedure followed in the first embodiment. Word selections are assembled into the temporary message memory and the entire constructed phrase spoken simply by activating the "TALK" control key 100. The same assembled message is continuously repeated with a slight pause between each complete utterance upon activation of the TALK REPEAT key 102. And the CLEAR control key 104 is utilized when it is desired to delete from memory the last entry made. In addition to initializing the unit preparatory to new message assembly, activation of the MASTER CLEAR key 106 will also automatically return the device to the first selection level.

Announced entry (ECHO) of word selections is provided by selecting level one and depressing the ECHO ON key 108. Similarly, the silent entry mode can be selected by depressing the ECHO OFF key 110 in the first level. In addition, a short tone burst will be emitted upon depression of any key to confirm entry of each selection if the beep mode is selected by depressing the BEEP key 112 in level one. Repeat activation of the BEEP key 112 will eliminate the tone. The PHRASE MODE NEW/SAVE key 114 in level one is also a toggle-type key switch similar to BEEP key 112 and is adapted to serve the same function as the number 999 entry in the first embodiment. In particular, initial activation of key 114 causes the contents of the temporary message memory to be retained after an assembled message has been spoken to permit editing of the assembled message. Repeat activation of key 114 returns the unit to its original mode wherein the contents of the temporary message memory are automatically cleared after the assembled phrase is spoken upon entry of the first selection in the new message.

Finally, it will be noted that a pair of keys labeled "MEMORY 1" 116 and "MEMORY 2" 118 is provided. Activation of one of these keys 116 and 118 in level one selects one of two temporary message memories. Since the second embodiment of the present invention does not display number code selection in synchronization with the voice as in the first embodiment, the memory capacity allocated for this purpose in the first embodiment is used in the second embodiment to provide a second temporary message memory capable of storing an additional 40 entries. Thus, the user can assemble two separate messages in the memories provided and selectively talk back either message.

The following is an assembly listing of the software for the microprocessor for both preferred embodiments, along with a list of the program variables appearing in the source code and their definitions.

| Variable | DEFINITION |
|---|---|
| ECO | Determines whether words are ecoed upon entry. |
| MODE | Determines phrase construction mode. |
| NOTE: ECO, MODE | are not changed by a master clear. |
| TLK | Equals 1 when in talking state. |
| RPT | Equals 1 when in talk repeat state. |
| BFPTR1 | |
| BFPTR | 16 bits indicate number of entries in buffer. |
| ADN | Used in numerical conversion routine. |
| WRD1 | |
| WRD2 | 16 bit accumulator used in numerical conv. |
| SCRL | Equals 1 when scrolling. |
| D1, D2, D3 | Temporary hold of digit entries. |
| DIGIT | Points to last digit entered. |
| DIS | Temporary hold of digit entered. |
| LOW | Indicates that the batteries are low. |
| COUNT | Keeps track of scrolling number. |
| TLKD | Indicates that a talk state just occured. |
| NXTDGT | indicates a scroll signal was received. |
| SMSK | Enables or inhibits scroll clock. |
| PMSK | Enables or inhibits phoneme clock. |
| KMSK | Enables or nhibits keyboard strobe. |
| ESTRG | Unused variable |
| TLKPT1 | |
| TLKPTR | 16 bits points to current word talking. |
| LWRD | Indicates if last entry in buffer is talking. |
| SAME | Used to track edge of scroll clock. |
| ENDBF | Indicates when 40 entry limit is reached. |
| SOFF | Enables or inhibits scrolled entries. |
| TP | Controls : on LCD. |
| HOLD | Used in numerical conversion. |
| ECOTP1 | |
| ECOTP | 16 bits used for eco pointer. |

TKCLR, TKADD, SENNON, SENOFF, CNCLD, CHRG, FULL are pointers to phonetic data used in voice feedback.

KBD, LCD, UPP are pointers to input and output port.

```
00001                          NAM     TERM3
00002                          OPT     0
00003           ++++++++++++++++++++++++++++++++++++++++++++
00004           +++++   TERMINAL #3 BATTERY OPERATION PROJECT
00005           +++++
00006           +++++   SOFTWARE PACKAGE FOLLOWS   T.A.G.  FSW
00007           ++++++++++++++++++++++++++++++++++++++++++++
00008           ++++++++++++++++++++++++++++++++++++++++++++
00009           +-------------------------------------------
00010           +
00011           +         BASE PAGE MEMORY RESERVATIONS
00012           +
00013           +         $0000-0051  82 BYTES WORD BUFFER
00014           +         $0052-007E  45 BYTES VARIABLES
00015           +         $0080-00D2  82 BYTES DISPLAY BFR
00016           +         $00D2-00FF  47 BYTES STACK
00017           +
00018           +-------------------------------------------
00019 0000                     ORG     $0000
00020 0000 0001    ECO         RMB     1
00021 0001 0001    MODE        RMB     1
00022 0052                     ORG     $0052
00023 0052 0001    TLK         RMB     1
00024 0053 0001    RPT         RMB     1
00025 0054 0001    BFPTR1      RMB     1
00026 0055 0001    BFPTR       RMB     1
```

```
00027 0056 0001    ADN     RMB     1
00028 0057 0001    WRD1    RMB     1
00029 0058 0001    WRD2    RMB     1
00030 0059 0001    SCRL    RMB     1
00031 005A 0001    D1      RMB     1
00032 005B 0001    D2      RMB     1
00033 005C 0001    D3      RMB     1
00034 005D 0001    DIGIT   RMB     1
00035 005E 0001    DIS     RMB     1
00036 005F 0001    LOW     RMB     1
00037 0060 0001    COUNT   RMB     1
00038 0061 0001    TLKD    RMB     1
00039 0062 0001    NXTDGT  RMB     1
00040 0063 0001    SMSK    RMB     1
00041 0064 0001    PMSK    RMB     1
00042 0065 0001    KMSK    RMB     1
00043 0066 0001    ESTRG   RMB     1
00044 0067 0001    TLKPT1  RMB     1
00045 0068 0001    TLKPTR  RMB     1
00046 0069 0001    LWRD    RMB     1
00047 006A 0001    SAME    RMB     1
00048 006B 0001    ENDBF   RMB     1
00049 006C 0001    SOFF    RMB     1
00050 006D 0001    TP      RMB     1
00051 006E 0001    HOLD    RMB     1
00052 006F 0001    ECOTP1  RMB     1
00053 0070 0001    ECOTP   RMB     1
00054 7F20                 ORG     $7F20
00055 7F20 BE      TKCLR   FCB     $BE,$8D,$B6,$B7,$B7,$DD,$AB
00056 7F27 85              FCB     $85,$85,$A1,$A9,$D2,$92,$BE
00057 7F2E AF              FCB     $AF,$80,$9D,$AA,$BA,$83,$AA
00058 7F35 F0              FCB     $F0,$D3,$D9,$BE,$FF
00059 7F3A 9D      TKADD   FCB     $9D,$AB,$85,$85,$A9,$52,$92,$BE
00060 7F42 5F              FCB     $5F,$9F,$45,$85,$E9,$8F,$9E,$BE
00061 7F4A AF              FCB     $AF,$80,$9D,$AA,$BA,$83,$AA
00062 7F51 F0              FCB     $F0,$D3,$D9,$BE,$FF
00063 7F56 9F      SENON   FCB     $9F,$AD,$8B,$AA,$90,$BE,$83
00064 7F5D 88              FCB     $88,$C8,$E3,$CD,$BE,$FF
00065 7F63 9F      SENOFF  FCB     $9F,$AD,$8B,$AA,$90,$BE,$BE
00066 7F6A F0              FCB     $F0,$F0,$F0,$DD,$BE,$FF
00067 7F70 99      CNCLD   FCB     $99,$AF,$80,$8D,$C4,$9F,$E3,$D8,$DE,$
00068 7F7B BE      CHRG    FCB     $BE,$AA,$90,$95,$A3,$AB,$9E,$9A,$8C
00069 7F84 D5              FCB     $D5,$A9,$8E,$AF,$C0,$DE,$FA,$E1
00070 7F8C E9              FCB     $E9,$FE,$FE,$FF
00071 7F90 7E      FULL    FCB     $7E,$BE,$8C,$C0,$80,$8C,$AB
00072 7F97 A9              FCB     $A9,$9D,$96,$D6,$D8,$BE,$FF
00073 7FFE                 ORG     $7FFE
00074 7FFE 7A00            FDB     $7A00
00075 1000                 ORG     $1000
00076 1000 0001    KBD     RMB     1
00077 2000                 ORG     $2000
00078 2000 0001    LCD     RMB     1
00079 3000                 ORG     $3000
00080 3000 0001    OPP     RMB     1
00081              *
00082              *
00083              *----------POWERUP ROUTINE----------------------
00084              *
00085              *
00086 7A00                 ORG     $7A00
00087 7A00 86 FF           LDA A   #$FF
00088 7A02 97 00           STA A   ECO
00089 7A04 97 01           STA A   MODE
00090 7A06 CE 0002 MCL     LDX     #$0002
00091 7A09 6F 00  LOOP1    CLR     0,X            CLEAR BASE PAGE CELLS
00092 7A0B 08              INX
00093 7A0C 8C 00FF         CPX     #$00FF
00094 7A0F 26 F8           BNE     LOOP1
00095 7A11 35              TXS
```

```
00097  7A12  86 80          LDA A   #$80
00098  7A14  97 64          STA A   PMSK
00099  7A16  B7 2000        STA A   LCD
00100  7A19  86 08          LDA A   #$08
00101  7A1B  97 5D          STA A   DIGIT
00102  7A1D  BD 7AAC        JSR     CLRDIS
00103  7A20  20 26          BRA     WAIT
00104  7A22  CE BF00  BEEP  LDX     #$BF00
00105  7A25  08        B0   INX
00106  7A26  26 FD          BNE     B0
00107  7A28  86 50          LDA A   #$50
00108  7A2A  B7 3000        STA A   OPP
00109  7A2D  CE E7F0        LDX     #$E7F0
00110  7A30  08        B1   INX
00111  7A31  26 FD          BNE     B1
00112  7A33  86 FF          LDA A   #$FF
00113  7A35  B7 3000        STA A   OPP
00114  7A38  39             RTS
00115  7A39  B6 1000  CLOCK LDA A   KBD
00116  7A3C  85 80          BIT A   #$80
00117  7A3E  26 F9          BNE     CLOCK
00118  7A40  B6 1000  CK2   LDA A   KBD
00119  7A43  85 80          BIT A   #$80
00120  7A45  27 F9          BEQ     CK2
00121  7A47  39             RTS
00122                *
00123                *
00124                *----------SCANNING SUBROUTINE----------------------
00125                *
00126                *
00127  7A48  96 59    WAIT  LDA A   SCRL
00128  7A4A  26 45          BNE     W1
00129  7A4C  96 52    W5    LDA A   TLK
00130  7A4E  85 04          BIT A   #$04
00131  7A50  26 14          BNE     UP
00132  7A52  B6 1000        LDA A   KBD
00133  7A55  9A 5F          ORA A   LOW
00134  7A57  85 10          BIT A   #$10
00135  7A59  26 0B          BNE     UP
00136  7A5B  C6 10          LDA B   #$10
00137  7A5D  D7 5F          STA B   LOW
00138  7A5F  C6 02          LDA B   #$02
00139  7A61  BD 7C85        JSR     BATT
00140  7A64  20 11          BRA     W2
00141  7A66  B6 1000  UP    LDA A   KBD
00142  7A69  84 80          AND A   #$80
00143  7A6B  9A 64          ORA A   PMSK
00144  7A6D  26 08          BNE     W2
00145  7A6F  B6 1000  L2    LDA A   KBD
00146  7A72  84 80          AND A   #$80
00147  7A74  27 F9          BEQ     L2
00148  7A76  39             RTS             RETURN
00149  7A77  B6 1000  W2    LDA A   KBD
00150  7A7A  94 65          AND A   KMSK
00151  7A7C  27 06          BEQ     W3
00152  7A7E  7F 0065        CLR     KMSK
00153  7A81  BD 7B27        JSR     KEYBD
00154  7A84  B6 1000  W3    LDA A   KBD
00155  7A87  84 40          AND A   #$40
00156  7A89  26 BD          BNE     WAIT
00157  7A8B  86 40          LDA A   #$40
00158  7A8D  97 65          STA A   KMSK
00159  7A8F  20 B7          BRA     WAIT
00160  7A91  B6 1000  W1    LDA A   KBD
00161  7A94  94 63          AND A   SMSK
00162  7A96  27 08          BEQ     W4
00163  7A98  96 6A          LDA A   SAME
00164  7A9A  26 B0          BNE     W5
00165  7A9C  73 006A        COM     SAME
```

```
00166  7A9F  39            RTS              RETURN
00167  7AA0  B6 1000  W4   LDA A    KBD
00168  7AA3  84 20         AND A    #$20
00169  7AA5  26 A5         BNE      W5
00170  7AA7  7F 006A       CLR      SAME
00171  7AAA  20 A0         BRA      W5
00172                *
00173                *
00174                *----------CLEAR DISPLAY SR----------------------
00175                *
00176                *
00177  7AAC  96 6D   CLRDIS LDA A   TP
00178  7AAE  9A 53         ORA A    RPT
00179  7AB0  B7 2000       STA A    LCD
00180  7AB3  86 7F         LDA A    #$7F
00181  7AB5  B7 2000       STA A    LCD
00182  7AB8  84 0F   DE    AND A    #$0F
00183  7ABA  B7 2000       STA A    LCD
00184  7ABD  39            RTS              RETURN
00185                *
00186                *
00187                *----------DISPLAY SUBROUTINE----------------------
00188                *
00189                *
00190  7ABE  9A 5D   DISPLY ORA A   DIGIT
00191  7AC0  5F            CLR B
00192  7AC1  F7 2000       STA B    LCD
00193  7AC4  B7 2000       STA A    LCD
00194  7AC7  20 EF         BRA      DE
00195                *
00196                *
00197                *----------DATA ENTER SUBROUTINE----------------------
00198                *
00199                *
00200  7AC9  7D 0001 ENTER  TST     MODE
00201  7ACC  27 08         BEQ      E6
00202  7ACE  7D 0061       TST      TLKD
00203  7AD1  27 03         BEQ      E6
00204  7AD3  7F 0055       CLR      BFPTR
00205  7AD6  7F 0061 E6    CLR      TLKD
00206  7AD9  96 6B         LDA A    ENDBF
00207  7ADB  26 39         BNE      E2
00208  7ADD  7C 0055       INC      BFPTR
00209  7AE0  7C 0055       INC      BFPTR
00210  7AE3  DE 54         LDX      BFPTR1
00211  7AE5  96 58         LDA A    WRD2
00212  7AE7  8A 40         ORA A    #$40
00213  7AE9  A7 00         STA A    0,X
00214                *
00215  7AEB  96 5C         LDA A    D3
00216  7AED  9A 5B         ORA A    D2
00217  7AEF  A7 7F         STA A    $7F,X
00218  7AF1  86 08         LDA A    #$08
00219  7AF3  97 5D         STA A    DIGIT
00220                *
00221  7AF5  08            INX
00222  7AF6  96 57         LDA A    WRD1
00223  7AF8  A7 00         STA A    0,X
00224                *
00225  7AFA  96 5A         LDA A    D1
00226  7AFC  A7 7F         STA A    $7F,X
00227  7AFE  BD 7BEE       JSR      CLEAR
00228  7B01  09            DEX
00229                *
00230  7B02  96 00         LDA A    ECO
00231  7B04  27 09         BEQ      E1
00232  7B06  BD 7A39       JSR      CLOCK
00233  7B09  7F 0064       CLR      PMSK
```

```
00234 7B0C BD 7CCD          JSR     WR1
00235 7B0F DE 54      E1    LDX     BFPTR1
00236 7B11 8C 0050          CPX     #$0050
00237 7B14 26 0D            BNE     E3
00238 7B16 86 01      E2    LDA A   #$01
00239 7B18 97 6B            STA A   ENDBF
00240 7B1A 7F 0064          CLR     PMSK
00241 7B1D CE 7F90          LDX     #FULL
00242 7B20 BD 7CD4          JSR     NPHN
00243 7B23 BD 7C7B   E3     JSR     PAUSE
00244 7B26 39               RTS             RETURN
00245                ♦
00246                ♦
00247                ♦---------KEYBOARD SERVICE SUBROUTINE--------------
00248                ♦
00249                ♦
00250 7B27 B6 1000 KEYBD    LDA A   KBD
00251 7B2A 84 0F            AND A   #$0F
00252 7B2C 97 5E            STA A   DIS
00253 7B2E D6 52            LDA B   TLK
00254 7B30 26 04            BNE     KA
00255 7B32 D6 59            LDA B   SCRL
00256 7B34 27 0E            BEQ     K1
00257 7B36 80 0D     KA     SUB A   #$0D
00258 7B38 26 75            BNE     K2
00259 7B3A 7F 0052          CLR     TLK
00260 7B3D 7F 0053          CLR     RPT
00261 7B40 7C 0062          INC     NXTDGT
00262 7B43 39               RTS             RETURN
00263                ♦
00264 7B44 81 09     K1     CMP A   #$09
00265 7B46 2E 4F            BGT     K3
00266 7B48 78 005D          ASL     DIGIT
00267 7B4B 2A 0E            BPL     SCENT
00268 7B4D BD 7E69          JSR     CCK
00269 7B50 7D 0052          TST     TLK
00270 7B53 26 74            BNE     C3
00271 7B55 C6 10            LDA B   #$10
00272 7B57 D7 5D            STA B   DIGIT
00273 7B59 96 5E            LDA A   DIS
00274 7B5B BD 7ABE SCENT    JSR     DISPLY
00275 7B5E 97 6E            STA A   HOLD
00276 7B60 86 02            LDA A   #$02
00277 7B62 D6 5D            LDA B   DIGIT
00278 7B64 58               ASL B
00279 7B65 2B 0D            BMI     K4
00280 7B67 86 14            LDA A   #$14
00281 7B69 58               ASL B
00282 7B6A 2B 0E            BMI     K5
00283 7B6C 86 C8            LDA A   #$C8
00284 7B6E D6 5E            LDA B   DIS
00285 7B70 D7 5C            STA B   D3
00286 7B72 20 0E            BRA     K6
00287                ♦
00288 7B74 D6 5E     K4     LDA B   DIS
00289 7B76 D7 5A            STA B   D1
00290 7B78 20 08            BRA     K6
00291                ♦
00292 7B7A D6 5E     K5     LDA B   DIS
00293 7B7C 58               ASL B
00294 7B7D 58               ASL B
00295 7B7E 58               ASL B
00296 7B7F 58               ASL B
00297 7B80 D7 5B            STA B   D2
00298                ♦
00299 7B82 97 56     K6     STA A   ADN
00300 7B84 96 57            LDA A   WRD1
00301 7B86 D6 6E            LDA B   HOLD
00302 7B88 27 0A     K7     BEQ     K8
```

```
00303 7B8A 9B 56            ADD A   ADN
00304 7B8C 24 03             BCC     K9
00305 7B8E 7C 0058           INC     WRD2
00306 7B91 5A         K9     DEC B
00307 7B92 20 F4             BRA     K7
00308 7B94 97 57      K8     STA A   WRD1
00309 7B96 39                RTS                     RETURN
00310 7B97 80 0A      K3     SUB A   #$0A
00311 7B99 26 0B             BNE     K10
00312 7B9B BD 7E69           JSR     CCK
00313 7B9E 96 52             LDA A   TLK
00314 7BA0 26 1A             BNE     C1
00315 7BA2 BD 7BCC           JSR     C2              TURN OFF
00316 7BA5 39                RTS                     RETURN
00317                  ♦
00318 7BA6 4A         K10    DEC A
00319 7BA7 27 10             BEQ     K11
00320 7BA9 4A                DEC A
00321 7BAA 27 27             BEQ     K12
00322 7BAC 4A                DEC A
00323 7BAD 27 2A             BEQ     K13
00324 7BAF 4A         K2     DEC A
00325 7BB0 27 48             BEQ     K14
00326 7BB2 4A                DEC A
00327 7BB3 27 01             BEQ     KJMP
00328 7BB5 39                RTS                     RETURN
00329 7BB6 7E 7A06   KJMP    JMP     MCL
00330                  ♦
00331 7BB9 7F 0053   K11     CLR     RPT
00332 7BBC 96 5D     C1      LDA A   DIGIT
00333 7BBE 81 08             CMP A   #$08
00334 7BC0 27 07             BEQ     C3
00335 7BC2 BD 7E69           JSR     CCK
00336 7BC5 86 08             LDA A   #$08
00337 7BC7 97 5D             STA A   DIGIT
00338 7BC9 BD 7C29   C3      JSR     TALK
00339 7BCC BD 7DF8   C2      JSR     TIME
00340 7BCF 7F 0052           CLR     TLK
00341 7BD2 39                RTS                     RETURN
00342 7BD3 86 08     K12     LDA A   #$08
00343 7BD5 97 53             STA A   RPT
00344 7BD7 20 E3             BRA     C1
00345                  ♦
00346 7BD9 BD 7CFF   K13     JSR     SCROLL
00347 7BDC 7F 0059           CLR     SCRL
00348 7BDF 86 08             LDA A   #$08
00349 7BE1 97 5D             STA A   DIGIT
00350 7BE3 8D 09             BSR     CLEAR
00351 7BE5 BD 7AAC           JSR     CLRDIS
00352 7BE8 96 52             LDA A   TLK
00353 7BEA 26 D0             BNE     C1
00354 7BEC 20 DE             BRA     C2
00355 7BEE 4F        CLEAR   CLR A
00356 7BEF 97 5A             STA A   D1
00357 7BF1 97 5B             STA A   D2
00358 7BF3 97 5C             STA A   D3
00359 7BF5 97 57             STA A   WRD1
00360 7BF7 97 58             STA A   WRD2
00361 7BF9 39                RTS
00362                  ♦
00363 7BFA 8D F2     K14     BSR     CLEAR
00364 7BFC 97 59             STA A   SCRL
00365 7BFE 97 53             STA A   RPT
00366 7C00 96 52             LDA A   TLK
00367 7C02 27 08             BEQ     CR1
00368 7C04 86 81             LDA A   #$81
00369 7C06 9A 6D             ORA A   TP
00370 7C08 B7 2000           STA A   LCD
00371 7C0B 39                RTS
```

```
00372 7C0C 96 5D    CR1    LDA A   DIGIT
00373 7C0E 81 08           CMP A   #$08
00374 7C10 27 08           BEQ     CR3
00375 7C12 BD 7C7B CR2    JSR     PAUSE
00376 7C15 86 08           LDA A   #$08
00377 7C17 97 5D           STA A   DIGIT
00378 7C19 39              RTS
00379 7C1A 7F 006B CR3    CLR     ENDBF
00380 7C1D 96 55           LDA A   BFPTR
00381 7C1F 27 F1           BEQ     CR2
00382 7C21 7A 0055         DEC     BFPTR
00383 7C24 7A 0055         DEC     BFPTR
00384 7C27 20 E9           BRA     CR2
00385                *
00386                *
00387                *---------TALK SUBROUTINE---------------------------
00388                *
00389                *
00390 7C29 96 55    TALK   LDA A   BFPTR
00391 7C2B 26 0E           BNE     T0          RETURN
00392 7C2D 39              RTS
00393 7C2E 7F 0069 TR     CLR     LWRD
00394 7C31 8D 48           BSR     PAUSE
00395 7C33 8D 46           BSR     PAUSE
00396 7C35 7F 0064         CLR     PMSK
00397 7C38 BD 7A48         JSR     WAIT
00398 7C3B 86 01    T0    LDA A   #$01
00399 7C3D 97 61           STA A   TLKD
00400 7C3F CE 0000         LDX     #$0000
00401 7C42 DF 67           STX     TLKPT1
00402 7C44 86 01           LDA A   #$01
00403 7C46 97 52           STA A   TLK
00404 7C48 7F 0064         CLR     PMSK
00405 7C4B BD 7A48         JSR     WAIT
00406 7C4E 7C 0068 T2     INC     TLKPTR
00407 7C51 7C 0068         INC     TLKPTR
00408 7C54 DE 67           LDX     TLKPT1
00409 7C56 9C 54           CPX     BFPTR1
00410 7C58 26 03           BNE     T1
00411 7C5A 7C 0069         INC     LWRD
00412 7C5D 8D 44    T1    BSR     WORD
00413 7C5F BD 7AAC         JSR     CLRDIS
00414 7C62 96 52           LDA A   TLK
00415 7C64 27 08           BEQ     T5
00416 7C66 96 69           LDA A   LWRD
00417 7C68 27 E4           BEQ     T2
00418 7C6A 96 53           LDA A   RPT
00419 7C6C 26 C0           BNE     TR
00420 7C6E 7F 0052 T5     CLR     TLK
00421 7C71 7F 0069         CLR     LWRD
00422 7C74 BD 7AAC         JSR     CLRDIS
00423 7C77 86 80           LDA A   #$80
00424 7C79 97 64           STA A   PMSK
00425                *
00426                *
00427                *---------PAUSE SUBROUTINE---------------------------
00428                *
00429                *
00430 7C7B BD 7AAC PAUSE  JSR     CLRDIS
00431 7C7E CE 4000         LDX     #$4000
00432 7C81 8D 4C           BSR     WRDECD
00433 7C83 C6 01           LDA B   #$01
00434 7C85 96 5F    BATT   LDA A   LOW
00435 7C87 27 19           BEQ     OUT
00436 7C89 86 7E           LDA A   #$7E
00437 7C8B B7 2000         STA A   LCD
00438 7C8E CE 7F7B         LDX     #CHRG
00439 7C91 7F 0064         CLR     PMSK
00440 7C94 BD 7CD4         JSR     NPHN
```

```
00441 7C97 5A              DEC  B
00442 7C98 26 EB            BNE  BATT
00443 7C9A 86 7E            LDA A #$7E
00444 7C9C B7 3000          STA A OPP
00445 7C9F BD 7DF8          JSR  TIME
00446 7CA2 39        OUT    RTS
00447                  ♦
00448                  ♦
00449                  ♦
00450                  ♦---------WORD SUBROUTINE---------------------------
00451                  ♦
00452                  ♦
00453 7CA3 7F 0063 WORD    CLR  SMSK
00454 7CA6 A6 7F           LDA A $7F,X
00455 7CA8 84 0F           AND A #$0F
00456 7CAA C6 10           LDA B #$10
00457 7CAC D7 5D           STA B DIGIT
00458 7CAE BD 7ABE         JSR  DISPLY
00459 7CB1 A6 7F           LDA A $7F,X
00460 7CB3 44              LSR  A
00461 7CB4 44              LSR  A
00462 7CB5 44              LSR  A
00463 7CB6 44              LSR  A
00464 7CB7 78 005D         ASL  DIGIT
00465 7CBA BD 7ABE         JSR  DISPLY
00466 7CBD 08              INX
00467 7CBE A6 7F           LDA A $7F,X
00468 7CC0 84 0F           AND A #$0F
00469 7CC2 78 005D         ASL  DIGIT
00470 7CC5 BD 7ABE         JSR  DISPLY
00471 7CC8 09              DEX
00472 7CC9 86 08           LDA A #$08
00473 7CCB 97 5D           STA A DIGIT
00474 7CCD EE 00   WR1     LDX  0,X
00475 7CCF 7F 0064 WRDECO  CLR  PMSK
00476                  ♦
00477 7CD2 EE 00           LDX  0,X
00478 7CD4 86 04   NPHN    LDA A #$04
00479 7CD6 9A 52           ORA A TLK
00480 7CD8 97 52           STA A TLK
00481 7CDA 86 81           LDA A #$81
00482 7CDC 9A 53           ORA A RPT
00483 7CDE 9A 6D           ORA A TP
00484 7CE0 B7 2000         STA A LCD
00485 7CE3 A6 00           LDA A 0,X
00486 7CE5 81 FF           CMP A #$FF
00487 7CE7 27 09           BEQ  WR2
00488 7CE9 B7 3000         STA A OPP
00489 7CEC 08              INX
00490 7CED BD 7A48         JSR  WAIT
00491 7CF0 20 E2           BRA  NPHN
00492                  ♦
00493 7CF2 86 01   WR2     LDA A #$01
00494 7CF4 94 52           AND A TLK
00495 7CF6 97 52           STA A TLK
00496 7CF8 26 04           BNE  WR3
00497 7CFA 86 80           LDA A #$80
00498 7CFC 97 64           STA A PMSK
00499 7CFE 39     WR3      RTS                RETURN
00500                  ♦
00501                  ♦---------SCROLLING SUBROUTINE--------------------
00502                  ♦
00503                  ♦
00504 7CFF 7F 0062 SCROLL  CLR  NXTDGT
00505 7D02 BD 7AAC         JSR  CLRDIS
00506 7D05 BD 7DA3         JSR  DELAY
00507 7D08 86 FF           LDA A #$FF
00508 7D0A 97 6A           STA A SAME
00509 7D0C 86 06           LDA A #$06
```

```
00510 7D0E 97 60            STA A   COUNT
00511 7D10 86 10            LDA A   #$10
00512 7D12 97 5D            STA A   DIGIT
00513 7D14 97 59            STA A   SCRL
00514 7D16 86 20            LDA A   #$20
00515 7D18 97 63            STA A   SMSK
00516 7D1A 96 6B            LDA A   ENDBF
00517 7D1C 26 4D            BNE     S03
00518 7D1E BD 7DA3   L3     JSR     DELAY
00519 7D21 7F 0060          CLR     COUNT
00520                ♦
00521 7D24 86 20    S0      LDA A   #$20
00522 7D26 97 63            STA A   SMSK
00523 7D28 96 60            LDA A   COUNT
00524 7D2A BD 7ABE          JSR     DISPLY
00525 7D2D 96 6C            LDA A   SOFF
00526 7D2F 26 27            BNE     SKIP
00527 7D31 96 00            LDA A   ECO
00528 7D33 27 1F            BEQ     S1
00529 7D35 7F 0063          CLR     SMSK
00530 7D38 96 60            LDA A   COUNT
00531 7D3A 48               ASL A
00532 7D3B CE 412C          LDX     #$412C
00533 7D3E DF 6F            STX     ECOTP1
00534 7D40 9B 70            ADD A   ECOTP
00535 7D42 97 70            STA A   ECOTP
00536 7D44 DE 6F            LDX     ECOTP1
00537 7D46 7F 0064          CLR     PMSK
00538 7D49 BD 7A48          JSR     WAIT
00539 7D4C BD 7CCF          JSR     WRDECO
00540 7D4F 86 7E            LDA A   #$7E
00541 7D51 B7 3000          STA A   OPP
00542 7D54 96 59    S1      LDA A   SCRL
00543 7D56 27 0B            BEQ     R1
00544 7D58 86 20    SKIP    LDA A   #$20
00545 7D5A 97 63            STA A   SMSK
00546 7D5C BD 7A48          JSR     WAIT
00547 7D5F 96 59            LDA A   SCRL
00548 7D61 26 01            BNE     S2
00549 7D63 39      R1       RTS
00550 7D64 96 6B   S2       LDA A   ENDBF
00551 7D66 26 03            BNE     S03
00552 7D68 7E 7E21          JMP     S3
00553 7D6B 86 40   S03      LDA A   #$40
00554 7D6D 97 5D            STA A   DIGIT
00555 7D6F 96 60            LDA A   COUNT
00556 7D71 D6 62            LDA B   NXTDGT
00557 7D73 27 20            BEQ     S70
00558 7D75 48               ASL A
00559 7D76 97 57            STA A   WRD1
00560 7D78 7F 0062          CLR     NXTDGT
00561 7D7B 7F 0058          CLR     WRD2
00562 7D7E 7E 7E3C          JMP     HOP
00563 7D81 16       CMD     TAB
00564 7D82 BD 7BEE          JSR     CLEAR
00565 7D85 BD 7AAC          JSR     CLRDIS
00566 7D88 17               TBA
00567 7D89 C6 08            LDA B   #$08
00568 7D8B D7 5D            STA B   DIGIT
00569 7D8D D6 6C            LDA B   SOFF
00570 7D8F 27 07            BEQ     S017
00571 7D91 80 08            SUB A   #$08
00572 7D93 20 38            BRA     S17
00573 7D95 7E 7E05  S70     JMP     S7
00574 7D98 4A       S017    DEC A
00575 7D99 4A               DEC A
00576 7D9A 26 16            BNE     S4
00577 7D9C 7F 0053          CLR     RPT
00578 7D9F 7C 0052          INC     TLK
```

```
00579 7DA2 39                    RTS                RETURN
00580 7DA3 B6 1000  DELAY   LDA A  KBD
00581 7DA6 85 20            BIT A  #$20
00582 7DA8 26 F9            BNE    DELAY
00583 7DAA B6 1000  DELAY2  LDA A  KBD
00584 7DAD 85 20            BIT A  #$20
00585 7DAF 27 F9            BEQ    DELAY2
00586 7DB1 39               RTS
00587 7DB2 4A       S4      DEC A
00588 7DB3 4A               DEC A
00589 7DB4 26 08            BNE    S5
00590 7DB6 86 08            LDA A  #$08
00591 7DB8 97 53            STA A  RPT
00592 7DBA 7C 0052          INC    TLK
00593 7DBD 39               RTS                RETURN
00594 7DBE 4A       S5      DEC A
00595 7DBF 4A               DEC A
00596 7DC0 26 03            BNE    S6
00597 7DC2 7E 7C1A          JMP    CR3
00598 7DC5 4A       S6      DEC A
00599 7DC6 4A               DEC A
00600 7DC7 26 04            BNE    S17
00601 7DC9 73 0000          COM    ECO
00602 7DCC 39               RTS
00603 7DCD 4A       S17     DEC A
00604 7DCE 4A               DEC A
00605 7DCF 26 03            BNE    S18
00606 7DD1 7E 7A06          JMP    MCL
00607 7DD4 4A       S18     DEC A
00608 7DD5 4A               DEC A
00609 7DD6 27 01            BEQ    S180
00610 7DD8 39               RTS
00611 7DD9 73 006C  S180    COM    SOFF
00612 7DDC 7F 0063          CLR    SMSK
00613 7DDF D6 6C            LDA B  SOFF
00614 7DE1 27 09            BEQ    S20
00615 7DE3 86 04            LDA A  #$04
00616 7DE5 97 6D            STA A  TP
00617 7DE7 CE 7F63          LDX    #SENOFF
00618 7DEA 20 06            BRA    TIME1
00619 7DEC 7F 006D  S20     CLR    TP
00620 7DEF CE 7F56          LDX    #SENON
00621 7DF2 7F 0064  TIME1   CLR    PMSK
00622 7DF5 BD 7CD4          JSR    NPHN
00623 7DF8 86 80    TIME    LDA A  #$80
00624 7DFA 9A 6D            ORA A  TP
00625 7DFC B7 2000          STA A  LCD
00626 7DFF 97 64            STA A  PMSK
00627 7E01 BD 7AAC          JSR    CLRDIS
00628 7E04 39               RTS
00629                         ◆
00630                         ◆
00631 7E05 81 06    S7      CMP A  #$06
00632 7E07 26 09            BNE    S8
00633 7E09 7F 0060          CLR    COUNT
00634 7E0C BD 7AAC          JSR    CLRDIS
00635 7E0F BD 7DA3          JSR    DELAY
00636 7E12 7C 0060  S8      INC    COUNT
00637 7E15 96 60            LDA A  COUNT
00638 7E17 81 0A            CMP A  #$0A
00639 7E19 26 03            BNE    SOJ
00640 7E1B 7F 0060          CLR    COUNT
00641 7E1E 7E 7D24  SOJ     JMP    SO
00642 7E21 96 62    S3      LDA A  NXTDGT
00643 7E23 27 ED            BEQ    S8
00644 7E25 96 60            LDA A  COUNT
00645 7E27 97 5E            STA A  DIS
00646 7E29 BD 7B5B          JSR    SCENT
00647 7E2C 7F 0062          CLR    NXTDGT
```

```
00648 7E2F 7F 0060           CLR     COUNT
00649 7E32 78 005D           ASL     DIGIT
00650 7E35 D6 5D             LDA B   DIGIT
00651 7E37 2B 03             BMI     HOP
00652 7E39 7E 7D1E           JMP     L3
00653 7E3C BD 7DA3  HOP      JSR     DELAY
00654 7E3F BD 7A22           JSR     BEEP
00655 7E42 86 88             LDA A   #$88
00656 7E44 9A 6D             ORA A   TP
00657 7E46 B7 2000           STA A   LCD
00658 7E49 BD 7A48           JSR     WAIT
00659 7E4C BD 7A48           JSR     WAIT
00660 7E4F 86 08             LDA A   #$08
00661 7E51 97 5D             STA A   DIGIT
00662 7E53 8D A3             BSR     TIME
00663 7E55 96 59             LDA A   SCRL
00664 7E57 26 01             BNE     S9
00665 7E59 39                RTS             RETURN
00666 7E5A 96 62   S9        LDA A   NXTDGT
00667 7E5C 27 0B             BEQ     CCK
00668 7E5E 7F 0062           CLR     NXTDGT
00669 7E61 CE 7F70           LDX     #CNCLD
00670 7E64 7F 0063           CLR     SMSK
00671 7E67 20 89             BRA     TIME1
00672 7E69 86 09   CCK       LDA A   #09
00673 7E6B 91 5A             CMP A   D1
00674 7E6D 26 0A             BNE     CCK2
00675 7E6F 91 5C             CMP A   D3
00676 7E71 26 06             BNE     CCK2
00677 7E73 86 90             LDA A   #$90
00678 7E75 91 5B             CMP A   D2
00679 7E77 27 1F             BEQ     MDE
00680 7E79 96 58   CCK2      LDA A   WRD2
00681 7E7B 26 12             BNE     S11
00682 7E7D 96 57             LDA A   WRD1
00683 7E7F 27 0E             BEQ     S11
00684 7E81 81 0C             CMP A   #$0C
00685 7E83 22 0A             BHI     S11
00686 7E85 7E 7D81           JMP     CMD
00687 7E88 7F 0059  S19      CLR     SCRL
00688 7E8B BD 7AC9           JSR     ENTER
00689 7E8E 39                RTS             RETURN
00690 7E8F 96 6C   S11       LDA A   SOFF
00691 7E91 27 F5             BEQ     S19
00692 7E93 96 59             LDA A   SCRL
00693 7E95 27 F1             BEQ     S19
00694 7E97 39                RTS             RETURN
00695 7E98 7F 0063  MDE      CLR     SMSK
00696 7E9B BD 7BEE           JSR     CLEAR
00697 7E9E 86 08             LDA A   #$08
00698 7EA0 97 5D             STA A   DIGIT
00699 7EA2 73 0001           COM     MODE
00700 7EA5 27 05             BEQ     M2
00701 7EA7 CE 7F20           LDX     #TKCLR
00702 7EAA 20 03             BRA     M3
00703 7EAC CE 7F3A  M2       LDX     #TKADD
00704 7EAF 7E 7DF2  M3       JMP     TIME1
00705       0000             END
ECO    0000  MODE   0001  TLK    0052  RPT    0053  BFPTR1 0054
BFPTR  0055  ADN    0056  WRD1   0057  WRD2   0058  SCRL   0059
D1     005A  D2     005B  D3     005C  DIGIT  005D  DIS    005E
LOW    005F  COUNT  0060  TLKD   0061  NXTDGT 0062  SMSK   0063
PMSK   0064  KMSK   0065  ESTRG  0066  TLKPT1 0067  TLKPTR 0068
LWRD   0069  SAME   006A  ENDBF  006B  SOFF   006C  TP     006D
HOLD   006E  ECOTP1 006F  ECOTP  0070  TKCLR  7F20  TKADD  7F3A
SENON  7F56  SENOFF 7F63  CNCLD  7F70  CHRG   7F7B  FULL   7F90
KBD    1000  LCD    2000  OPP    3000  MCL    7A06  LOOP1  7A09
BEEP   7A22  B0     7A25  B1     7A30  CLOCK  7A39  CK2    7A40
WAIT   7A48  W5     7A4C  UP     7A66  L2     7A6F  W2     7A77
```

```
W3      7A84  W1      7A91  W4      7AA0  CLRDIS 7AAC  DE     7AB8
DISPLY  7ABE  ENTER   7AC9  E6      7AD6  E1     7B0F  E2     7B16
E3      7B23  KEYBD   7B27  KA      7B36  K1     7B44  SCENT  7B5B
K4      7B74  K5      7B7A  K6      7B82  K7     7B88  K9     7B91
K8      7B94  K3      7B97  K10     7BA6  K2     7BAF  KJMP   7BB6
K11     7BB9  C1      7BBC  C3      7BC9  C2     7BCC  K12    7BD3
K13     7BD9  CLEAR   7BEE  K14     7BFA  CR1    7C0C  CR2    7C12
CR3     7C1A  TALK    7C29  TR      7C2E  T0     7C3B  T2     7C4E
T1      7C5D  T5      7C6E  PAUSE   7C7B  BATT   7C85  OUT    7CA2
WORD    7CA3  WR1     7CCD  WRDECO  7CCF  NPHN   7CD4  WR2    7CF2
WR3     7CFE  SCROLL  7CFF  L3      7D1E  S0     7D24  S1     7D54
SKIP    7D58  R1      7D63  S2      7D64  S03    7D6B  CMD    7D81
S70     7D95  S017    7D98  DELAY   7DA3  DELAY2 7DAA  S4     7DB2
S5      7DBE  S6      7DC5  S17     7DCD  S18    7DD4  S180   7DD9
S20     7DEC  TIME1   7DF2  TIME    7DF8  S7     7E05  S8     7E12
S0J     7E1E  S3      7E21  HOP     7E3C  S9     7E5A  CCK    7E69
CCK2    7E79  S19     7E88  S11     7E8F  MDE    7E98  M2     7EAC
M3      7EAF

TOTAL ERRORS 00000

00001                         NAM    TERM1
00002                         OPT    O
00003             ◆◆◆◆◆◆◆◆◆◆◆◆◆◆◆◆◆◆◆◆◆◆◆◆◆◆◆◆◆◆◆◆◆◆◆◆◆◆◆◆◆◆◆◆
00004             ◆◆◆◆◆ TERMINAL #1 BATTERY OPERATION PROJECT
00005             ◆◆◆◆◆
00006             ◆◆◆◆◆ SOFTWARE PACKAGE FOLLOWS  T.A.G.  FSW
00007             ◆◆◆◆◆◆◆◆◆◆◆◆◆◆◆◆◆◆◆◆◆◆◆◆◆◆◆◆◆◆◆◆◆◆◆◆◆◆◆◆◆◆◆◆
00008             ◆◆◆◆◆◆◆◆◆◆◆◆◆◆◆◆◆◆◆◆◆◆◆◆◆◆◆◆◆◆◆◆◆◆◆◆◆◆◆◆◆◆◆◆
00009             ◆-------------------------------------------
00010             ◆
00011             ◆         BASE PAGE MEMORY RESERVATIONS
00012             ◆
00013             ◆     $0000-004F 80 BYTES WORD BUFFER 1
00014             ◆     $0050-009F 80 BYTES WORD BUFFER 2
00015             ◆     $00A0-00CF 48 BYTES VARIABLES
00016             ◆     $00D0-00FF 48 BYTES STACK
00017             ◆
00018             ◆-------------------------------------------
00019 0000                    ORG    $0000
00020 0000 0001   ECO    RMB   1
00021 0001 0001   MODE   RMB   1
00022 00A0                     ORG    $A0
00023 00A0 0001   SOUND  RMB   1
00024 00A1 0001   BFPM11 RMB   1
00025 00A2 0001   BFPM10 RMB   1
00026 00A3 0001   BFPM21 RMB   1
00027 00A4 0001   BFPM20 RMB   1
00028 00A5 0001   MFL1   RMB   1
00029 00A6 0001   MFL2   RMB   1
00030 00A7 0001   MEM    RMB   1
00031 00A8 0001   PMSK   RMB   1
00032 00A9 0001   KMSK   RMB   1
00033 00AA 0001   NEGEDG RMB   1
00034 00AB 0000   LSTENT FDB
00035 00AD 0001   LWRD   RMB   1
00036 00AE 0001   LOW    RMB   1
00037 00AF 0001   LEVEL  RMB   1
00038 00B0 0001   VON    RMB   1
00039 00B1 0001   LOOP   RMB   1
00040 00B2 0001   LSTA   RMB   1
00041 00B3 0001   LSTB   RMB   1
00042 00B4 0001   OCOUNT RMB   1
00043 00B5 0001   COUNT  RMB   1
00044 00B6 0001   NMBR1  RMB   1
00045 00B7 0001   NMBR2  RMB   1
00046 00B8 0001   BFPTR1 RMB   1
00047 00B9 0001   BFPTR  RMB   1
```

```
00048 00BA 0001      TLK     RMB     1
00049 00BB 0001      RPT     RMB     1
00050 00BC 0001      TLKD    RMB     1
00051 00BD 0001      ROW     RMB     1
00052 00BE 0001      TLKPT1  RMB     1
00053 00BF 0001      TLKPTR  RMB     1
00054 7F91                   ORG     $7F91
00055 7F91 8D        TKCLR   FCB     $8D,$B6,$B7,$B7,$DD,$AB,$85,$85
00056 7F99 A1                FCB     $A1,$A9,$D2,$92,$BE,$AF,$80,$9D
00057 7FA1 AA                FCB     $AA,$BA,$83,$AA,$F0,$D3,$D9,$FF
00058 7FA9 9D        TKADD   FCB     $9D,$AB,$85,$85,$A9,$52,$92,$BE
00059 7FB1 5F                FCB     $5F,$9F,$45,$85,$E9,$8F,$9E,$BE,$AF,$
00060 7FBB 9D                FCB     $9D,$AA,$BA,$83,$AA,$F0,$D3,$D9,$FF
00061 7FC4 AA        CHRG    FCB     $AA,$90,$95,$A3,$AB,$9E,$9A,$8C,$D5,$
00062 7FCE 8E                FCB     $8E,$AF,$C0,$DE,$FA,$E1,$E9
00063 7FD5 FE                FCB     $FE,$FE,$FF
00064 7FD8 BE        MEM1    FCB     $BE,$8C,$C0,$80,$8C,$AB
00065 7FDE A9                FCB     $A9,$ED,$E3,$E3,$CD,$FF
00066 7FE4 9D                FCB     $9D,$96,$D6,$D8,$BE,$FF
00067 7FEA 7E        MEM2    FCB     $7E,$BE,$8C,$C0,$80,$8C,$AB,$A9
00068 7FF2 AA                FCB     $AA,$B6,$F6,$F7,$F7,$FF
00069 7FF8 9D                FCB     $9D,$96,$D6,$D8,$BE,$FF
00070 7FFE                   ORG     $7FFE
00071 7FFE 7C00              FDB     $7C00
00072 1000                   ORG     $1000
00073 1000 0001      KBD     RMB     1
00074 2000                   ORG     $2000
00075 2000 0001      LED     RMB     1
00076 3000                   ORG     $3000
00077 3000 0001      OPP     RMB     1
00078                *
00079                *
00080                *----------POWERUP ROUTINE----------------------
00081                *
00082                *
00083 7C00                   ORG     $7C00
00084 7C00 86 FF             LDA A   #$FF
00085 7C02 97 00             STA A   ECO
00086 7C04 97 A0             STA A   SOUND
00087 7C06 97 01             STA A   MODE
00088 7C08 B7 3000            STA A   OPP
00089 7C0B CE 00A1            LDX     #$00A1
00090 7C0E 20 03              BRA     LOOP1
00091 7C10 CE 00A8    MCL    LDX     #$00A8
00092 7C13 6F 00      LOOP1  CLR     0,X       CLEAR BASE PAGE CELLS
00093 7C15 08                INX
00094 7C16 8C 00FF            CPX     #$00FF
00095 7C19 26 F8              BNE     LOOP1
00096 7C1B 5F                 CLR B
00097 7C1C 35                 TXS
00098 7C1D 86 80              LDA A   #$80
00099 7C1F 97 A8              STA A   PMSK
00100 7C21 BD 7F10            JSR     BEEP
00101 7C24 BD 7DCC            JSR     DELAY
00102 7C27 96 A7              LDA A   MEM
00103 7C29 26 06              BNE     P2
00104 7C2B 97 A2              STA A   BFPM10
00105 7C2D 97 A5              STA A   MFL1
00106 7C2F 20 06              BRA     WAIT
00107 7C31 7F 00A4   P2      CLR     BFPM20
00108 7C34 7F 00A6            CLR     MFL2
00109                *
00110                *----------SCANNING SUBROUTINE----------------
00111                *
00112                *
00113 7C37 B6 1000   WAIT    LDA A   KBD
00114 7C3A 9A AE              ORA A   LOW
00115 7C3C 85 10              BIT A   #$10
00116 7C3E 26 07              BNE     UP
```

```
00117  7C40  C6 10            LDA B   #$10
00118  7C42  D7 AE            STA B   LOW
00119  7C44  BD 7F30          JSR     BATT
00120  7C47  B6 1000    UP    LDA A   KBD
00121  7C4A  9A A8            ORA A   PMSK
00122  7C4C  84 80            AND A   #$80
00123  7C4E  26 08            BNE     S3
00124  7C50  B6 1000    S1    LDA A   KBD
00125  7C53  85 80            BIT A   #$80
00126  7C55  27 F9            BEQ     S1
00127  7C57  39               RTS             RETURN
00128  7C58  D7 BD      S3    STA B   ROW
00129  7C5A  DA AF            ORA B   LEVEL
00130  7C5C  CA 40            ORA B   #$40
00131  7C5E  DA B0            ORA B   VON
00132  7C60  F7 2000          STA B   LED
00133  7C63  C4 0F            AND B   #$0F
00134  7C65  96 04            LDA A   #$04
00135  7C67  97 B1            STA A   LOOP
00136  7C69  B6 1000    S4    LDA A   KBD
00137  7C6C  7A 00B1          DEC     LOOP
00138  7C6F  84 40            AND A   #$40
00139  7C71  9A A9            ORA A   KMSK
00140  7C73  27 26            BEQ     STROBE
00141  7C75  96 B1            LDA A   LOOP
00142  7C77  26 F0            BNE     S4
00143  7C79  D6 BD      S7    LDA B   ROW
00144  7C7B  D1 B3            CMP B   LSTB
00145  7C7D  26 11            BNE     S5
00146  7C7F  B6 1000          LDA A   KBD
00147  7C82  94 A9            AND A   KMSK
00148  7C84  84 40            AND A   #$40
00149  7C86  27 08            BEQ     S5
00150  7C88  7A 00B4          DEC     OCOUNT
00151  7C8B  26 03            BNE     S5
00152  7C8D  7F 00A9          CLR     KMSK
00153  7C90  5C         S5    INC B
00154  7C91  C1 10            CMP B   #$10
00155  7C93  2D A2            BLT     WAIT
00156  7C95  7F 00BD          CLR     ROW
00157  7C98  5F               CLR B
00158  7C99  20 9C            BRA     WAIT
00159  7C9B  B6 1000    STROBE LDA A  KBD
00160  7C9E  84 0F            AND A   #$0F
00161  7CA0  91 B2            CMP A   LSTA
00162  7CA2  26 06            BNE     S6
00163  7CA4  D6 BD            LDA B   ROW
00164  7CA6  D1 B3            CMP B   LSTB
00165  7CA8  27 09            BEQ     S8
00166  7CAA  97 B2      S6    STA A   LSTA
00167  7CAC  D7 B3            STA B   LSTB
00168  7CAE  7F 00B5          CLR     COUNT
00169  7CB1  20 C6            BRA     S7
00170  7CB3  7C 00B5    S8    INC     COUNT
00171  7CB6  86 02            LDA A   #$02
00172  7CB8  91 B5            CMP A   COUNT
00173  7CBA  26 BD            BNE     S7
00174  7CBC  7F 00B5          CLR     COUNT
00175  7CBF  96 BA            LDA A   TLK
00176  7CC1  27 0A            BEQ     S8B
00177  7CC3  96 B3            LDA A   LSTB
00178  7CC5  26 B2            BNE     S7
00179  7CC7  86 05            LDA A   #$05
00180  7CC9  91 B2            CMP A   LSTA
00181  7CCB  2E AC            BGT     S7
00182  7CCD  86 40      S8B   LDA A   #$40
00183  7CCF  97 A9            STA A   KMSK
00184  7CD1  86 02            LDA A   #02
00185  7CD3  97 B4            STA A   OCOUNT
```

```
00186 7CD5 BD 7DD9           JSR    KEYBRD
00187 7CD8 86 7E             LDA A  #$7E
00188 7CDA B7 3000            STA A  OPP
00189 7CDD 20 9A             BRA    S7
00190                  *
00191                  *
00192                  *----------ENTER WORD SUBROUTINE--------------------
00193                  *
00194                  *
00195 7CDF 7D 00A7 ENTER      TST    MEM
00196 7CE2 26 09             BNE    E1
00197 7CE4 96 A5             LDA A  MFL1
00198 7CE6 27 1B             BEQ    ENT
00199 7CE8 CE 7FD8 F1         LDX    #MEM1
00200 7CEB 20 07             BRA    FULL
00201 7CED 96 A6  E1          LDA A  MFL2
00202 7CEF 27 12             BEQ    ENT
00203 7CF1 CE 7FEA F2         LDX    #MEM2
00204 7CF4 7F 00A8 FULL       CLR    PMSK
00205 7CF7 BD 7F6B           JSR    NPHN
00206 7CFA 08                INX
00207 7CFB BD 7F6B           JSR    NPHN
00208 7CFE 86 80             LDA A  #$80
00209 7D00 97 A8             STA A  PMSK
00210 7D02 39                RTS                    RETURN
00211 7D03 D6 AF  ENT         LDA B  LEVEL
00212 7D05 26 05             BNE    E2
00213 7D07 CE 0000            LDX    #$0
00214 7D0A 20 15             BRA    E5
00215 7D0C C0 10  E2          SUB B  #$10
00216 7D0E 26 05             BNE    E3
00217 7D10 CE 00F0            LDX    #240
00218 7D13 20 0C             BRA    E5
00219 7D15 C0 10  E3          SUB B  #$10
00220 7D17 26 05             BNE    E4
00221 7D19 CE 01E0            LDX    #480
00222 7D1C 20 03             BRA    E5
00223 7D1E CE 02D0 E4         LDX    #720
00224 7D21 DF B6  E5          STX    NMBR1
00225 7D23 96 B7             LDA A  NMBR2
00226 7D25 D6 B6             LDA B  NMBR1
00227 7D27 7D 00B2 E6         TST    LSTA
00228 7D2A 27 0A             BEQ    E7
00229 7D2C 0C                CLC
00230 7D2D 8B 1E             ADD A  #30
00231 7D2F C9 00             ADC B  #0
00232 7D31 7A 00B2           DEC    LSTA
00233 7D34 20 F1             BRA    E6
00234 7D36 78 00B3 E7         ASL    LSTB
00235 7D39 0C                CLC
00236 7D3A 9B B3             ADD A  LSTB
00237 7D3C C9 00             ADC B  #0
00238 7D3E 74 00B3           LSR    LSTB
00239 7D41 80 02             SUB A  #$02
00240 7D43 C2 00             SBC B  #$0
00241 7D45 CA 40             ORA B  #$40
00242 7D47 97 B7             STA A  NMBR2
00243 7D49 D7 B6             STA B  NMBR1
00244 7D4B DE B6             LDX    NMBR1
00245 7D4D 9C AB             CPX    LSTENT
00246 7D4F 26 02             BNE    E9
00247 7D51 20 49             BRA    OK1
00248 7D53 7D 00A7 E9         TST    MEM
00249 7D56 26 23             BNE    E10
00250 7D58 7D 0001           TST    MODE
00251 7D5B 27 08             BEQ    E9B
00252 7D5D 7D 00BC           TST    TLKD
00253 7D60 27 03             BEQ    E9B
00254 7D62 7F 00A2           CLR    BFPM10
```

```
00255 7D65 DE A1    E9B    LDX    BFPM11
00256 7D67 08              INX
00257 7D68 08              INX
00258 7D69 E7 00           STA B  0,X
00259 7D6B 08              INX
00260 7D6C A7 00           STA A  0,X
00261 7D6E 09              DEX
00262 7D6F DF A1            STX    BFPM11
00263 7D71 8C 004E          CPX    #$4E
00264 7D74 26 26            BNE    OK1
00265 7D76 7C 00A5          INC    MFL1
00266 7D79 20 21            BRA    OK1
00267 7D7B 7D 0001 E10     TST    MODE
00268 7D7E 27 08            BEQ    E10B
00269 7D80 7D 00BC          TST    TLKD
00270 7D83 27 03            BEQ    E10B
00271 7D85 7F 00A4          CLR    BFPM20
00272 7D88 DE A3    E10B   LDX    BFPM21
00273 7D8A 08              INX
00274 7D8B 08              INX
00275 7D8C E7 50    OK     STA B  $50,X
00276 7D8E 08              INX
00277 7D8F A7 50           STA A  $50,X
00278 7D91 09              DEX
00279 7D92 DF A3           STX    BFPM21
00280 7D94 8C 004E         CPX    #$4E
00281 7D97 26 03           BNE    OK1
00282 7D99 7C 00A6         INC    MFL2
00283 7D9C 7F 00BC OK1    CLR    TLKD
00284 7D9F 96 00           LDA A  ECO
00285 7DA1 27 1B           BEQ    E8
00286 7DA3 BD 7F4D         JSR    CLOCK
00287 7DA6 DE B6           LDX    NMBR1
00288 7DA8 BD 7F66         JSR    WRDECO
00289 7DAB 86 80           LDA A  #$80
00290 7DAD 97 A8           STA A  PMSK
00291 7DAF 86 7E           LDA A  #$7E
00292 7DB1 B7 3000         STA A  OPP
00293 7DB4 96 A0           LDA A  SOUND
00294 7DB6 26 06           BNE    E8
00295 7DB8 CE 8F00         LDX    #$8F00
00296 7DBB BD 7DCF         JSR    DELAY1
00297 7DBE DE B6    E8     LDX    NMBR1
00298 7DC0 9C AB           CPX    LSTENT
00299 7DC2 27 03           BEQ    E8B
00300 7DC4 BD 7F10         JSR    BEEP
00301 7DC7 DE B6    E8B    LDX    NMBR1
00302 7DC9 DF AB           STX    LSTENT
00303 7DCB 39              RTS                RETURN
00304                *
00305                *
00306                *
00307                *
00308 7DCC CE BF00 DELAY  LDX    #$BF00
00309 7DCF 08      DELAY1 INX
00310 7DD0 8C FFFF         CPX    #$FFFF
00311 7DD3 26 FA           BNE    DELAY1
00312 7DD5 39              RTS
00313                *
00314                *----------KEYBOARD SERVICE SUBROUTINE---------------
00315                *
00316                *
00317 7DD6 7E 7CDF NTER   JMP    ENTER
00318 7DD9 D6 B3   KEYBRD LDA B  LSTB
00319 7DDB 7D 00BA         TST    TLK
00320 7DDE 27 04           BEQ    K1
00321 7DE0 5D              TST B
00322 7DE1 27 5B           BEQ    TK
00323 7DE3 39              RTS                RETURN
```

```
00324 7DE4 5D          K1    TST  B
00325 7DE5 27 5D             BEQ  K2
00326 7DE7 96 AF             LDA A LEVEL
00327 7DE9 26 EB             BNE  NTER
00328 7DEB 96 B2             LDA A LSTA
00329 7DED 26 E7             BNE  NTER
00330 7DEF 5A               DEC  B
00331 7DF0 27 E4             BEQ  NTER
00332 7DF2 86 10             LDA A #$10
00333 7DF4 5A          EC    DEC  B
00334 7DF5 26 06             BNE  NEC
00335 7DF7 97 00             STA A ECO
00336 7DF9 BD 7F10           JSR  BEEP
00337 7DFC 39                RTS                  RETURN
00338 7DFD 5A          NEC   DEC  B
00339 7DFE 26 06             BNE  BEP
00340 7E00 D7 00             STA B ECO
00341 7E02 BD 7F10           JSR  BEEP
00342 7E05 39                RTS                  RETURN
00343 7E06 5A          BEP   DEC  B
00344 7E07 26 07             BNE  MDE
00345 7E09 73 00A0           COM  SOUND
00346 7E0C BD 7F10           JSR  BEEP
00347 7E0F 39                RTS                  RETURN
00348 7E10 5A          MDE   DEC  B
00349 7E11 26 0F             BNE  M1
00350 7E13 73 0001           COM  MODE
00351 7E16 27 05             BEQ  MDE2
00352 7E18 CE 7F91           LDX  #TKCLR
00353 7E1B 20 03             BRA  MDE3
00354 7E1D CE 7FA9  MDE2     LDX  #TKADD
00355 7E20 20 08   MDE3      BRA  MSW
00356 7E22 5A          M1    DEC  B
00357 7E23 26 0F             BNE  M2
00358 7E25 D7 A7             STA B MEM
00359 7E27 CE 7FD8           LDX  #MEM1
00360 7E2A D7 A8   MSW       STA B PMSK
00361 7E2C BD 7F6B           JSR  NPHN
00362 7E2F 86 80             LDA A #$80
00363 7E31 97 A8             STA A PMSK
00364 7E33 39                RTS                  RETURN
00365 7E34 5A          M2    DEC  B
00366 7E35 26 9F             BNE  NTER
00367 7E37 97 A7             STA A MEM
00368 7E39 CE 7FEA           LDX  #MEM2
00369 7E3C 20 EC             BRA  MSW
00370 7E3E 96 B2    TK       LDA A LSTA
00371 7E40 80 05             SUB A #$05
00372 7E42 20 3B             BRA  CL
00373 7E44 96 B2    K2       LDA A LSTA
00374 7E46 26 04             BNE  L2
00375 7E48 97 AF             STA A LEVEL
00376 7E4A 20 19             BRA  LBP
00377 7E4C 4A        L2      DEC  A
00378 7E4D 26 06             BNE  L3
00379 7E4F 86 10             LDA A #$10
00380 7E51 97 AF             STA A LEVEL
00381 7E53 20 10             BRA  LBP
00382 7E55 4A        L3      DEC  A
00383 7E56 26 06             BNE  L4
00384 7E58 86 20             LDA A #$20
00385 7E5A 97 AF             STA A LEVEL
00386 7E5C 20 07             BRA  LBP
00387 7E5E 4A        L4      DEC  A
00388 7E5F 26 08             BNE  T
00389 7E61 86 30             LDA A #$30
00390 7E63 97 AF             STA A LEVEL
00391 7E65 BD 7F10  LBP      JSR  BEEP
00392 7E68 39                RTS                  RETURN
```

```
00393 7E69 4A        T       DEC  A
00394 7E6A 26 0A             BNE     R
00395 7E6C 97 BB             STA  A  RPT
00396 7E6E 86 01     TRE     LDA  A  #$01
00397 7E70 97 BA             STA  A  TLK
00398 7E72 BD 7EB3           JSR     TALK
00399 7E75 39               RTS              RETURN
00400 7E76 4A        R       DEC  A
00401 7E77 26 06             BNE     CL
00402 7E79 86 01             LDA  A  #$01
00403 7E7B 97 BB             STA  A  RPT
00404 7E7D 20 EF             BRA     TRE
00405 7E7F 4A        CL      DEC  A
00406 7E80 26 2A             BNE     M
00407 7E82 96 BA             LDA  A  TLK
00408 7E84 27 05             BEQ     CL2
00409 7E86 D7 BB             STA  B  RPT
00410 7E88 D7 BA             STA  B  TLK
00411 7E8A 39        CL0     RTS              RETURN
00412 7E8B BD 7F10   CL2     JSR     BEEP
00413 7E8E 96 A7             LDA  A  MEM
00414 7E90 26 0D             BNE     CL3
00415 7E92 96 A2             LDA  A  BFPM10
00416 7E94 27 F4             BEQ     CL0
00417 7E96 7A 00A2            DEC     BFPM10
00418 7E99 7A 00A2            DEC     BFPM10
00419 7E9C D7 A5             STA  B  MFL1
00420 7E9E 39               RTS              RETURN
00421 7E9F 96 A4    CL3      LDA  A  BFPM20
00422 7EA1 27 E7             BEQ     CL0
00423 7EA3 D7 A6             STA  B  MFL2
00424 7EA5 7A 00A4            DEC     BFPM20
00425 7EA8 7A 00A4            DEC     BFPM20
00426 7EAB 39               RTS              RETURN
00427 7EAC 4A        M       DEC  A
00428 7EAD 26 03             BNE     MRT
00429 7EAF 7E 7C10           JMP     MCL
00430 7EB2 39        MRT     RTS              RETURN
00431                 ♦
00432                 ♦
00433                 ♦----------TALK SUBROUTINE--------------------
00434                 ♦
00435                 ♦
00436 7EB3 7D 00A7   TALK    TST     MEM
00437 7EB6 26 06             BNE     TM2
00438 7EB8 DE A1             LDX     BFPM11
00439 7EBA DF B8             STX     BFPTR1
00440 7EBC 20 04             BRA     TM0
00441 7EBE DE A3    TM2      LDX     BFPM21
00442 7EC0 DF B8             STX     BFPTR1
00443 7EC2 96 B9    TM0      LDA  A  BFPTR
00444 7EC4 26 09             BNE     T0
00445 7EC6 20 36             BRA     T5
00446 7EC8 7F 00AD  TR       CLR     LWRD
00447 7ECB 8D 70             BSR     OU
00448 7ECD 8D 61             BSR     BATT
00449 7ECF CE 0000  T0       LDX     #$0000
00450 7ED2 DF BE             STX     TLKPT1
00451 7ED4 86 01             LDA  A  #$01
00452 7ED6 97 BA             STA  A  TLK
00453 7ED8 97 BC             STA  A  TLKD
00454 7EDA 7F 00A8           CLR     PMSK
00455 7EDD BD 7C37           JSR     WAIT
00456 7EE0 7C 00BF  T2       INC     TLKPTR
00457 7EE3 7C 00BF           INC     TLKPTR
00458 7EE6 DE BE             LDX     TLKPT1
00459 7EE8 9C B8             CPX     BFPTR1
00460 7EEA 26 03             BNE     T1
00461 7EEC 7C 00AD           INC     LWRD
```

```
00462 7EEF BD 7F5C  T1    JSR    WORD
00463 7EF2 96 BA          LDA A  TLK
00464 7EF4 27 08          BEQ    T5
00465 7EF6 96 AD          LDA A  LWRD
00466 7EF8 27 E6          BEQ    T2
00467 7EFA 96 BB          LDA A  RPT
00468 7EFC 26 CA          BNE    TR
00469 7EFE 7F 00BA  T5    CLR    TLK
00470 7F01 7F 00AD        CLR    LWRD
00471 7F04 86 80          LDA A  #$80
00472 7F06 97 A8          STA A  PMSK
00473 7F08 86 7E          LDA A  #$7E
00474 7F0A B7 3000        STA A  OPP
00475 7F0D 8D 21          BSR    BATT
00476 7F0F 39             RTS           RETURN
00477                ◊
00478                ◊
00479                ◊----------BEEP SUBROTINE----------------------
00480                ◊
00481                ◊
00482 7F10 8D 3B    BEEP   BSR    CLOCK
00483 7F12 96 AF           LDA A  LEVEL
00484 7F14 8A 80           ORA A  #$80
00485 7F16 B7 2000         STA A  LED
00486 7F19 96 A0           LDA A  SOUND
00487 7F1B 27 04           BEQ    B2
00488 7F1D 86 7E           LDA A  #$7E
00489 7F1F 20 02           BRA    B3
00490 7F21 86 C0    B2     LDA A  #$C0
00491 7F23 B7 3000  B3     STA A  OPP
00492 7F26 8D 25           BSR    CLOCK
00493 7F28 86 FF           LDA A  #$FF
00494 7F2A B7 3000         STA A  OPP
00495 7F2D 8D 1E           BSR    CLOCK
00496 7F2F 39              RTS           RETURN
00497                ◊
00498                ◊
00499                ◊----------PAUSE SUBROUTINE----------------------
00500                ◊
00501                ◊
00502 7F30 7F 00A8  BATT   CLR    PMSK
00503 7F33 96 AE           LDA A  LOW
00504 7F35 27 06           BEQ    OU
00505 7F37 CE 7FC4         LDX    #CHRG
00506 7F3A BD 7F6B         JSR    NPHN
00507 7F3D 86 7E    OU     LDA A  #$7E
00508 7F3F B7 3000         STA A  OPP
00509 7F42 BD 7C37         JSR    WAIT
00510 7F45 BD 7F4D         JSR    CLOCK
00511 7F48 86 80           LDA A  #$80
00512 7F4A 97 A8           STA A  PMSK
00513 7F4C 39              RTS           RETURN
00514                ◊
00515                ◊
00516                ◊----------CLOCK S.R.----------------------
00517                ◊
00518                ◊
00519 7F4D B6 1000  CLOCK  LDA A  KBD
00520 7F50 85 80           BIT A  #$80
00521 7F52 26 F9           BNE    CLOCK
00522 7F54 B6 1000  CK2    LDA A  KBD
00523 7F57 85 80           BIT A  #$80
00524 7F59 27 F9           BEQ    CK2
00525 7F5B 39              RTS           RETURN
00526                ◊
00527                ◊
00528                ◊
00529                ◊----------WORD SUBROUTINE----------------------
00530                ◊
```

```
00531                          *
00532  7F5C  96 A7     WORD    LDA  A   MEM
00533  7F5E  26 04             BNE      W2
00534  7F60  EE 00             LDX      0,X
00535  7F62  20 02             BRA      WRDECO
00536  7F64  EE 50     W2      LDX      $50,X
00537  7F66  7F 00A8   WRDECO  CLR      PMSK
00538                          *
00539  7F69  EE 00             LDX      0,X
00540  7F6B  86 04     NPHN    LDA  A   #$04
00541  7F6D  9A BA             ORA  A   TLK
00542  7F6F  97 BA             STA  A   TLK
00543  7F71  A6 00             LDA  A   0,X
00544  7F73  81 FF             CMP  A   #$FF
00545  7F75  27 09             BEQ      WR2
00546  7F77  B7 3000           STA  A   OPP
00547  7F7A  08                INX
00548  7F7B  BD 7C37           JSR      WAIT
00549  7F7E  20 EB             BRA      NPHN
00550                          *
00551  7F80  86 01     WR2     LDA  A   #$01
00552  7F82  94 BA             AND  A   TLK
00553  7F84  97 BA             STA  A   TLK
00554  7F86  39                RTS               RETURN
00555        0000              END
```

| | | | | | | | |
|---|---|---|---|---|---|---|---|
| ECO | 0000 | MODE | 0001 | SOUND | 00A0 | BFPM11 | 00A1 | BFPM10 | 00A2 |
| BFPM21 | 00A3 | BFPM20 | 00A4 | MFL1 | 00A5 | MFL2 | 00A6 | MEM | 00A7 |
| PMSK | 00A8 | KMSK | 00A9 | NEGEDG | 00AA | LSTENT | 00AB | LWRD | 00AD |
| LOW | 00AE | LEVEL | 00AF | VON | 00B0 | LOOP | 00B1 | LSTA | 00B2 |
| LSTB | 00B3 | OCOUNT | 00B4 | COUNT | 00B5 | NMBR1 | 00B6 | NMBR2 | 00B7 |
| BFPTR1 | 00B8 | BFPTR | 00B9 | TLK | 00BA | RPT | 00BB | TLKD | 00BC |
| ROW | 00BD | TLKPT1 | 00BE | TLKPTR | 00BF | TKCLR | 7F91 | TKADD | 7FA9 |
| CHRG | 7FC4 | MEM1 | 7FD8 | MEM2 | 7FEA | KBD | 1000 | LED | 2000 |
| OPP | 3000 | MCL | 7C10 | LOOP1 | 7C13 | P2 | 7C31 | WAIT | 7C37 |
| UP | 7C47 | S1 | 7C50 | S3 | 7C58 | S4 | 7C69 | S7 | 7C79 |
| S5 | 7C90 | STROBE | 7C9B | S6 | 7CAA | S8 | 7CB3 | S8B | 7CCD |
| ENTER | 7CDF | F1 | 7CE8 | E1 | 7CED | F2 | 7CF1 | FULL | 7CF4 |
| ENT | 7D03 | E2 | 7D0C | E3 | 7D15 | E4 | 7D1E | E5 | 7D21 |
| E6 | 7D27 | E7 | 7D36 | E9 | 7D53 | E9B | 7D65 | E10 | 7D7B |
| E10B | 7D88 | OK | 7D8C | OK1 | 7D9C | E8 | 7DBE | E8B | 7DC7 |
| DELAY | 7DCC | DELAY1 | 7DCF | NTER | 7DD6 | KEYBRD | 7DD9 | K1 | 7DE4 |
| EC | 7DF4 | NEC | 7DFD | BEP | 7E06 | MDE | 7E10 | MDE2 | 7E1D |
| MDE3 | 7E20 | M1 | 7E22 | MSW | 7E2A | M2 | 7E34 | TK | 7E3E |
| K2 | 7E44 | L2 | 7E4C | L3 | 7E55 | L4 | 7E5E | LBP | 7E65 |
| T | 7E69 | TRE | 7E6E | R | 7E76 | CL | 7E7F | CL0 | 7E8A |
| CL2 | 7E8B | CL3 | 7E9F | M | 7EAC | MRT | 7EB2 | TALK | 7EB3 |
| TM2 | 7EBE | TM0 | 7EC2 | TR | 7EC8 | T0 | 7ECF | T2 | 7EE0 |
| T1 | 7EEF | T5 | 7EFE | BEEP | 7F10 | B2 | 7F21 | B3 | 7F23 |
| BATT | 7F30 | OU | 7F3D | CLOCK | 7F4D | CK2 | 7F54 | WORD | 7F5C |
| W2 | 7F64 | WRDECO | 7F66 | NPHN | 7F6B | WR2 | 7F80 | | |

While the above description constitutes the preferred embodiments of the invention, it will be appreciated that the invention is susceptible to modification, variation and change without departing from the proper scope or fair meaning of the accompanying claims.

What is claimed is:

1. In a portable artificial voice system for the verbally handicapped, including first memory means having prestored therein digital data identifying phonemes phonetically defining a vocabulary of words, input means for randomly selecting words from said vocabulary, second memory means for temporarily storing said word selections in the order entered, computer means for reading the selections stored in said second memory means and retrieving from said first memory means the digital data identifying the phonemes phonetically defining said word selections, and synthesizer means responsive to the digital data retrieved by said computer means for synthetically speaking the words identified by said selections by integrating the phonemes identified by said data into intelligible sounding human speech; the method of generating synthesized speech including the steps of: entering via said input means a plurality of encoded word selections into said second memory means, and activating said computer means to repetitively perform the following sequence of steps until the entire message entered via said input means has been synthetically spoken; (1) reading the first (next) encoded word selection stored in said second memory means, (2) accessing the appropriate memory address location(s) in said first memory means by first accessing the intermediary memory address location in said first memory means identified by said encoded word selection, reading the address data contained in said intermediary address location, and then accessing the memory address location(s) identified by said address data, (3) reading the digital data stored in said memory address location(s), and (4) providing said digital data to said synthesizer means.

2. The method of generating synthesized speech defined in claim 1 wherein the step of entering a plurality of encoded word selections into said second memory means comprises the repetitive steps of entering an encoded word selection via said input means and storing said encoded word selection into said second memory means.

3. The method of generating speech defined in claim 1 wherein said input means includes a numeric keyboard and said plurality of encoded word selections are made by entering number codes on said numeric keyboard.

4. The method of generating speech defined in claim 1 wherein said input means includes a keyboard area comprised of a plurality of touch-sensitive switches, and said plurality of encoded word selections are made by actuating individual ones of said switches.

5. The method of generating speech defined in claim 1 wherein said input means includes a single switch and a numeric display comprised of a multiplicity of digits which are adapted to scroll in sequence, and said plurality of encoded word selections are made by activating said switch once for each digit in said display which is effective to stop each scrolling digit at the point of activation.

6. A portable artificial voice system for the verbally handicapped comprising:
a phoneme based speech synthesizer that is responsive to successive digital data provided to its input identifying a desired sequence of phonemes for synthetically generating and integrating the phonemes identified by said input data into intelligible sounding speech;
a digital vocabulary memory having prestored therein digital data representing a plurality of phonemes which are arranged in groups of one or more sequentially stored phonemes which phonetically define a preselected vocabulary of words;
input means for entering random encoded word selections from said prestored vocabulary of words;
a temporary memory for storing a plurality of said encoded word selections in the order entered by said input means; and
a microprocessor programmed to sequentially read the encodsed word selections stored in said temporary memory and access the appropriate address locations in said vocabulary memory by first accessing the intermediary memory address location in said vocabulary memory identified by said encoded word selection, reading the address data contained in said intermediary address location, and then accessing the memory address location(s) identified by said address data to retrieve therefrom the digital data representing the groups of phonemes corresponding to the encoded word selections read from said temporary memory and provide said digital data in the appropriate sequence to said speech synthesizer.

7. The portable artificial voice system of claim 6 wherein said microprocessor is programmed to sequentially read the word selections stored in said temporary memory and access said vocabulary memory in response to a TALK command entered and received from said input means.

8. The portable artificial voice system of claim 6 wherein said microprocessor is programmed to provide said digital data to said synthesizer in accordance with the rate at which said synthesizer generates and integrates said phonemes such that the rate at which speech is produced by said synthesizer is independent of the rate at which said word selections are made via said input means.

9. The voice system of claim 6 further including switching means connected between said microprocessor and said digital vocabulary memory for disabling said digital vocabulary memory whenever said microprocessor is not retrieving data from said digital vocabulary memory.

10. The voice system of claim 9 wherein said system is operable by a portable battery source.

11. The voice system of claim 6 wherein the vocabulary of words prestored in said digital vocabulary memory includes isolated words and individual phonemes.

12. The method of generating synthesized speech defined in claim 1 wherein said computer means provides digital data to said synthesizer means in accordance with the rate at which said synthesizer means generates and integrates said phonemes such that the rate of speech production is controlled by said synthesizer means.

13. In a portable artificial voice system for the verbally handicapped including a memory having stored therein parametric data defining a vocabulary of words, input means for entering encoded word selections a microprocessor programmed to access the appropriate locations in said memory corresponding to said word selections and retrieve therefrom the parametric data stored therein, and a synthesizer responsive to said parametric data for synthetically speaking the message comprised of said word selections; the improvement wherein said input means includes a single switch and a numeric display comprised of a multiplicity of digits, said microprocessor being further programmed to scroll the digits in said display and sequentially stop each digit upon the successive activation of said switch once for each digit in said display, to thereby enter an encoded word selection.

14. In a portable artificial voice system for the verbally handicapped, including vocabulary memory means having prestored therein digital data identifying phonemes phonetically defining a vocabulary of words, input means for randomly selecting words from said vocabulary including a single switch and a numeric display comprised of a multiplicity of digits, computer means responsive to said input means for retrieving from said vocabulary memory means the digital data identifying the phonemes phonetically defining said encoded word selections, and synthesizer means responsive to the digital data retrieved by said computer means for synthetically speaking the words identified by said selections by integrating the phonemes identified by said data into intelligible sounding human speech; the method of generating synthesized speech including the steps of entering a plurality of word selections via said input means by scrolling the digits in said numeric display and sequentially stopping each digit upon the successive activation of said switch once for each digit in said display to thereby enter an encoded word selection, and thereafter activating said synthesizer means to synthetically speak the message consisting of said encoded word selections.

* * * * *